US012566105B2

(12) United States Patent
Philipson et al.

(10) Patent No.: US 12,566,105 B2
(45) Date of Patent: Mar. 3, 2026

(54) OBLIQUE LIGHTING SYSTEM FOR INSPECTION OF END CONNECTORS OF FIBER OPTIC CABLES BY MICROSCOPE

(71) Applicant: VIAVI SOLUTIONS INC., Chandler, AZ (US)

(72) Inventors: Joshua Benjamin Julius Philipson, Ottawa (CA); Kevin Cassady, Monroe, WA (US); Nicklos Joseph Bulitka, Stittsville (CA); Christopher Russell Wagner, Kanata (CA); Christian Richard Comtois-Arnaldo, Ottawa (CA)

(73) Assignee: VIAVI SOLUTIONS INC., Chandler, AZ (US)

(*) Notice: Subject to any disclaimer, the term of this patent is extended or adjusted under 35 U.S.C. 154(b) by 275 days.

(21) Appl. No.: 18/504,540

(22) Filed: Nov. 8, 2023

(65) Prior Publication Data

US 2025/0146902 A1 May 8, 2025

(51) Int. Cl.
*G01M 11/00* (2006.01)
*G02B 21/10* (2006.01)
*G02B 21/36* (2006.01)

(52) U.S. Cl.
CPC .............. *G01M 11/30* (2013.01); *G02B 21/10* (2013.01); *G02B 21/367* (2013.01)

(58) Field of Classification Search
CPC ....... G02B 21/10; G02B 21/367; G01M 11/30
See application file for complete search history.

(56) References Cited

U.S. PATENT DOCUMENTS

| | | | | | |
|---|---|---|---|---|---|
| 5,997,164 | A | * | 12/1999 | Betts | .................... G02B 21/084 |
| | | | | | 362/583 |
| 2007/0201020 | A1 | * | 8/2007 | Li | ...................... G01N 21/8806 |
| | | | | | 356/237.2 |
| 2013/0335976 | A1 | * | 12/2013 | Ben-Ezer | ............... G02B 21/10 |
| | | | | | 362/311.12 |
| 2020/0183094 | A1 | * | 6/2020 | Policante | ............... G01M 11/30 |

FOREIGN PATENT DOCUMENTS

| | | | | | |
|---|---|---|---|---|---|
| WO | WO-0066998 | A2 | * | 11/2000 | .......... G01N 21/952 |
| WO | WO-2016133412 | A1 | * | 8/2016 | .......... G06V 30/413 |

OTHER PUBLICATIONS

Chris Hammond, "Symmetrical Ray Diagrams of the Optical Pathways in Light Microscopes", Microscopy and Analysis, Sep. 2006, 4 pages.

* cited by examiner

*Primary Examiner* — Dominic J Bologna
*Assistant Examiner* — Christina I Xing
(74) *Attorney, Agent, or Firm* — Mannava & Kang, P.C.

(57) ABSTRACT

Systems, methods, and devices for inspection, under a microscope, of end connectors of fiber optic cables are provided. In one aspect, a light ring including a circular array of light sources provides darkfield illumination to an end connector being inspected under a microscope. Each of the light sources may be lit in series and the resulting shadows may be used to identify dirt on the end connector, as well as to determine whether any dirt identified on the end connector can be cleaned off. In another aspect, a light ring combined with a redirection ring (e.g., a reflector and/or refractor ring) may provide darkfield illumination. In yet another aspect, a series of images may be captured and analyzed to automatically identify dirt on the end connector, as well as to determine whether any identified dirt can be cleaned off.

14 Claims, 15 Drawing Sheets

Simplex

Simplex

MPO

MPO

LIGHT RING
310

LEDs
315

ATTACHMENT
ELEMENT
330

MICROSCOPE
315

LIGHT
RING
310

LEDs
315

INNER
REFLECTIVE
SURFACE
325

REFLECTOR
RING
320

OBLIQUE
LIGHTING

REFLECTOR
RING
320

INNER
REFLECTIVE
SURFACE
325

Oblique Lighting System
with Refractor Ring
(*cross-sectional view*)

Light Ring
(planar view)

Refractor Ring
(perspective view)

Oblique Lighting System
with Refractor Ring
(cross-sectional view)

| ALPHA [°] | AOI [°] | H [mm] |
|---|---|---|
| 10 | 80 | 2.1 |
| 20 | 70 | 4.4 |
| 30 | 60 | 6.9 |
| 32 | 58 | 7.5 |
| 40 | 50 | 10.1 |
| 50 | 40 | 14.3 |

LEDs
815

LIGHT RING
810

LEDs
815

LIGHT RING
810

MICROSCOPE
805

LIGHT RING
810

32°

MICROSCOPE
805

855

LIGHT RING
810

850

Oblique Lighting System

Darkfield

Brightfield

After Cleaning

Before Cleaning

Time Series – Darkfield Illumination

Revealed Features

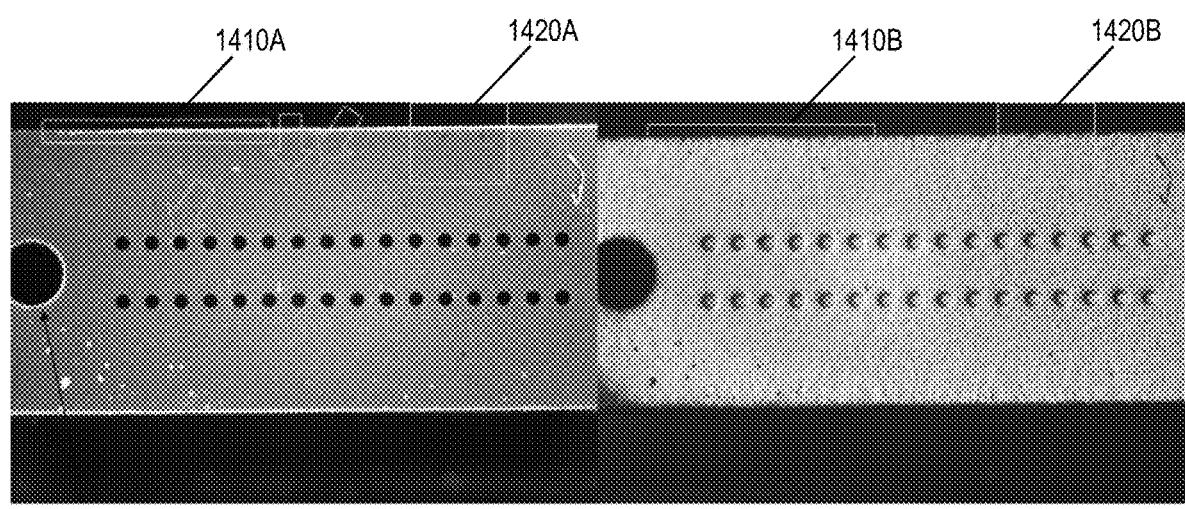
FIG. 14A
Darkfield
FIG. 14B
Brightfield
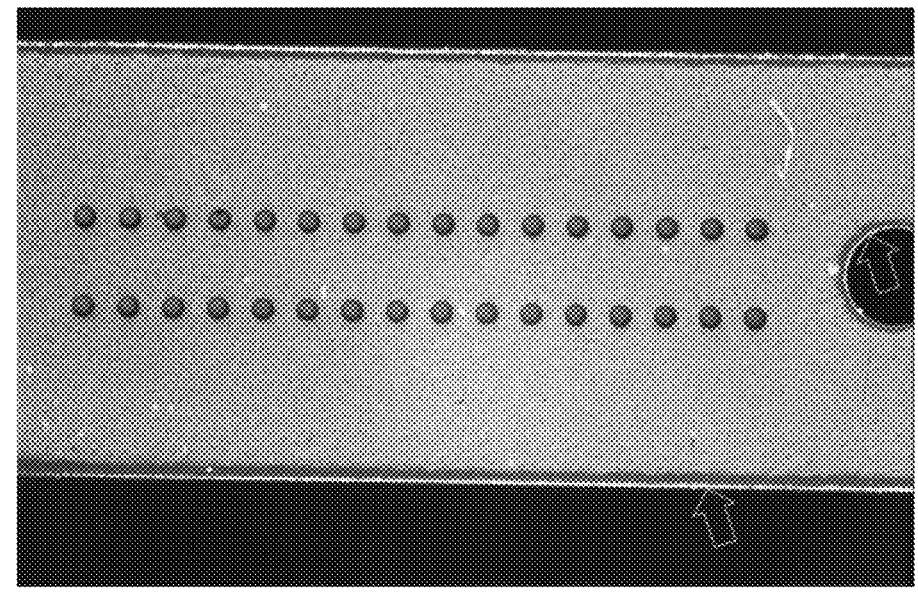
FIG. 14C
Darkfield + Brightfield Darkfield Brightfield No. of LEDs = 4

No. of LEDs = 8

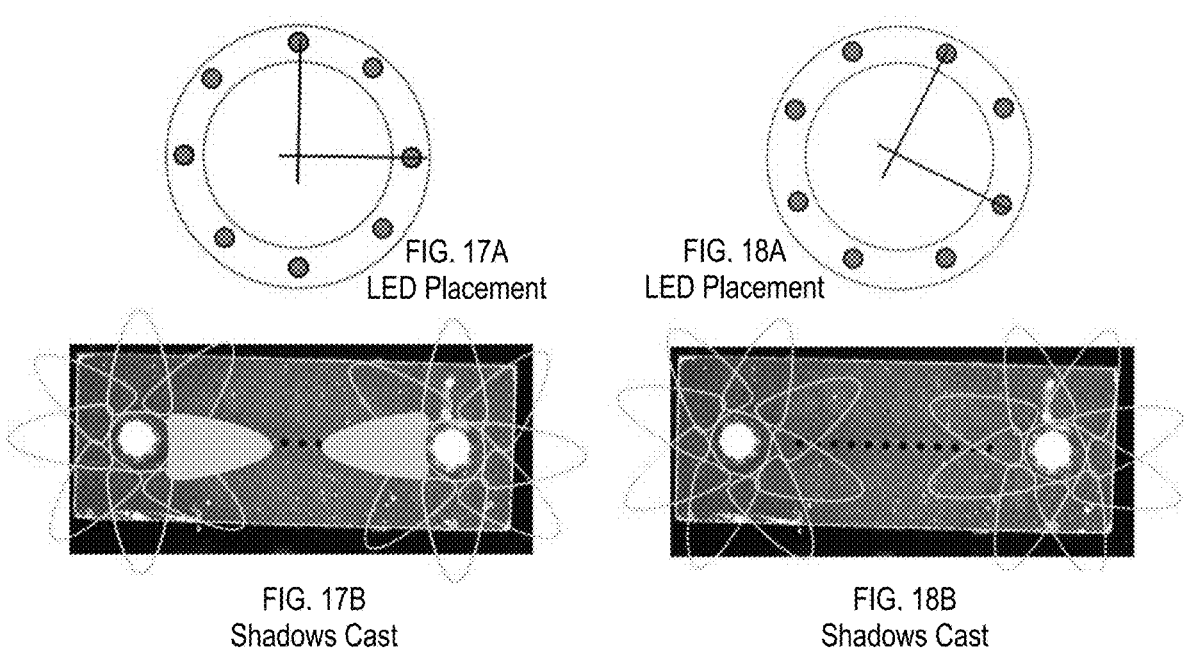
FIG. 17A
LED Placement
FIG. 18A
LED Placement
FIG. 17B
Shadows Cast
FIG. 18B
Shadows Cast
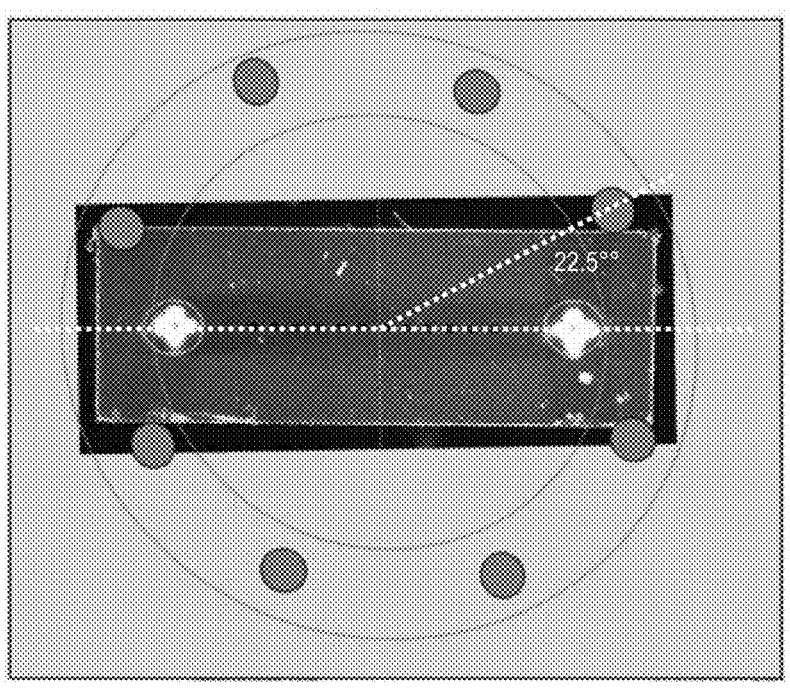
FIG. 18C
LED in rel. to End Connector Feature Measurement

OBLIQUE LIGHTING SYSTEM FOR INSPECTION OF END CONNECTORS OF FIBER OPTIC CABLES BY MICROSCOPE

TECHNICAL FIELD

This disclosure is directed generally to the inspection of end connectors of fiber optic cables, and more specifically, to using oblique lighting/darkfield illumination when inspecting end connectors of fiber optic cables by microscope.

BACKGROUND

Many networks use fiber optic cable for the transmission of communications, such as, e.g., telecommunication networks, Ethernet networks, etc. The end connectors of such fiber optic cable may need to meet a certain level of quality control for optimum usage, including, for example, a level of cleanliness and/or a lack of defects. In any factory setting for fiber optic equipment, microscopic equipment may be used to inspect hundreds to thousands of fiber optic end connectors during any given shift (i.e., over an 8-hour period). Generally speaking, any systems, apparatuses, and/or methods which may save time, reduce costs, increase efficiency, and/or otherwise improve such microscopic inspections may be beneficial.

BRIEF DESCRIPTION OF DRAWINGS

Features of the present disclosure are illustrated by way of example and not limited in the following figure(s), in which like numerals indicate like elements, in which:

FIG. 1A is a block diagram illustrating brightfield illumination, while FIGS. 1B and 1C illustrate a simplex end connector and a Multi-fiber Push-On/Pull-Off (MPO) connector, respectively, for a fiber optic cable under brightfield illumination, which may be applied by examples of the present disclosure.

FIG. 2A is a block diagram illustrating darkfield illumination, while FIGS. 2B and 2C illustrate a simplex end connector and an MPO connector, respectively, for a fiber optic cable under darkfield illumination, which may be applied by examples of the present disclosure.

FIGS. 14A, 14B, and 14C are images illustrating how brightfield illumination and darkfield illumination may be combined in accordance with an example of the present disclosure.

FIGS. 17A, 17B, 18A, 18B, and 18C are diagrams and images illustrating how the effects of pin shadows may be mitigated by the placement of light sources on the light ring, according to examples of the present disclosure.

DETAILED DESCRIPTION

Figures 1A, 1B, 1C, 2A, 2B, 2C:
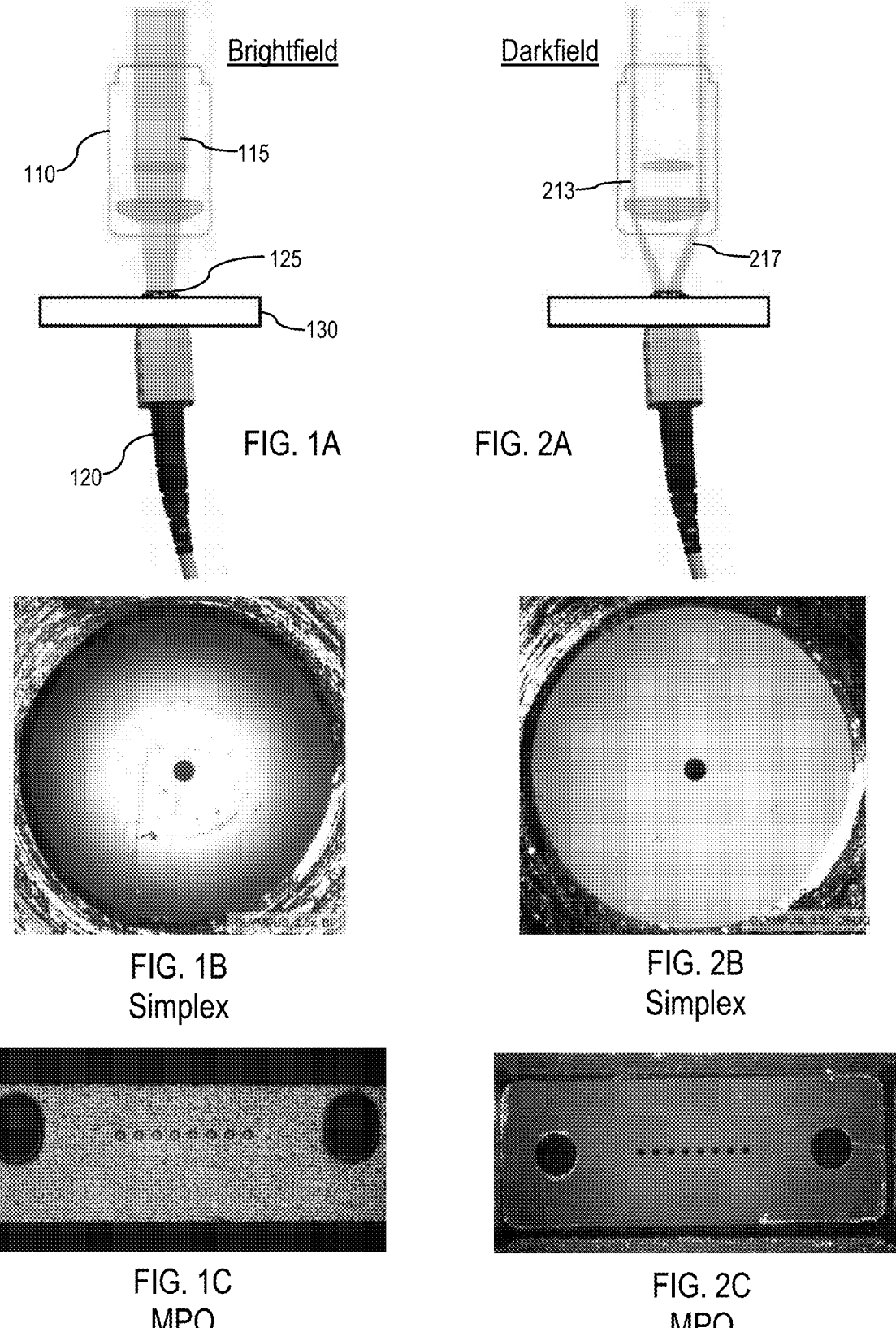

For simplicity and illustrative purposes, the present disclosure is described by referring mainly to examples and embodiments thereof. In the following description, numerous specific details are set forth in order to provide a thorough understanding of the present disclosure. It will be readily apparent, however, that the present disclosure may be practiced without limitation to these specific details. In other instances, some methods and structures readily understood by one of ordinary skill in the art have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

As discussed above, manufacturers of fiber optic equipment may perform a large number of visual inspections, usually using microscopy equipment, of end connectors for fiber optics for quality control purposes (e.g., cleaning of the ferrule surface, detection of particulate matter ("dirt"), detection of imperfections, etc.). Hereinafter the term "end connector" may be used to refer to any type of connector used in fiber optics, including, but not limited to, a simplex end connector, a Ferrule Connector or Fiber Channel (FC), a Mechanical Transfer (MT) jack/connector, a Multi-fiber Push-On/Pull-Off (MPO) connector (International Electrotechnical Commission (IEC) 61754-7; Electronic Industries Alliance (EIA)/Telecommunication Industry Association (EIA/TIA) 604-5), an E-2000 connector (IEC 61754-15), an F-3000 connector, (IEC 61754-20), a Subscriber Connector (SC—i.e., IEC 61754-4), a Sub Miniature A (SMA—i.e., IEC 61754-2), MT-RJ (IEC 61754-18), or any other IEC/ IEA/TIA standard interface/connector for fiber optics, and/ or any other form of end connector suitable for use with fiber optics, as would be understood by one of ordinary skill in the art.

As briefly mentioned above, there may be difficulties in determining whether the ferrule surface of the end connector is indeed dirty (i.e., having extraneous particulate matter); whether such dirt/particulate matter may be cleanable; whether other defects and/or imperfections are present; and generally determining what actions (if any) may be taken based on what is viewed by the microscope of the end connector (e.g., whether to clean the ferrule surface, to polish the ferrule surface, correct defects/imperfections, dispose of defective unit, etc.).

According to examples of the present disclosure, systems, methods, and apparatuses for optimized darkfield oblique lighting may enable, e.g., (i) identification of cleanable particulate matter on the ferrule surface of an end connector; (ii) determination whether any identified dirt/particulate matter may be cleanable; (iii) determination whether other defects and/or imperfections are present in the end connector; (iv) determination generally concerning what action or actions (if any) may be taken based on what is viewed by the microscope of the end connector (e.g., whether to clean the ferrule surface, to polish the ferrule surface, correct defects/ imperfections, dispose of defective unit, etc.); and other capabilities/applications (such as identifications, determinations, calculations, measurements, etc.) as discussed and/or described below, as well as capabilities/applications not explicitly and/or fully described and/or discussed below, but would be understood by one of ordinary skill in the art as a capability/application based merely upon the description herein and knowledge of the field of technology. Accordingly, while the detection of surface particulates and/or the determination whether such detected surface particulates are cleanable may be the primary focus in some of the descriptions below, examples of the present disclosure are not so limited and may also provide for the detection of other defects and/or imperfections of the end connector, as well as measurements of qualities/features of the end connector (such as, e.g., dimensional features of the end connector), as would be understood by one of ordinary skill in the art. In some examples, trigonometry may be employed to calculate and/or otherwise determine the dimensional features of end connectors (such as, e.g., the height, width, and/or depth of component structures such as pins).

In some examples of the present disclosure, a high angle of incidence (AOI) may be employed in a darkfield technique for illumination of a device under test (DUT), which may be, e.g., an end connector of a fiber optic cable and/or a similar optical component. In such examples, the darkfield technique may rely on capturing scattered light from particulate matter on the end connector, which may allow for easily visually separating relatively fine particulate matter from a complex background of the ferrule surface of an end connector by the shadows formed by the fine particulate matter. In some examples, the darkfield technique may be employed to detect scratches, pits, hillocks, and other defects and/or imperfections in the ferrule surface, as well as defects and/or imperfections in the overall structure of the end connector (such as defects/imperfections in, e.g., pin height, pin holes, and other structural features). In some examples, the darkfield technique may be employed to obtain measurements of any qualities/features of the end connector and, in some instances, provide such measurements to a user.

In some examples, the appropriate/suitable AOI for the darkfield technique may vary in accordance with the particular implementation of the present disclosure, e.g., the specific dimensions of the microscopic inspection system to which the example of the present disclosure is to be applied. Generally speaking, an appropriate/suitable AOI may be achieved by designing the implementation to provide the minimum AOI where the chief ray of each light source of an example of the present disclosure may be roughly directed at about the center of the surface of the DUT when it is positioned in the microscopic inspection system. Generally speaking, such designing in accordance with the present disclosure may involve considering features such as, for example, (1) the diameter of the objective lens of the system; (2) the properties of the one or more light sources providing the darkfield illumination; and (3) the working distance (WD) of the microscopic inspection system. These considerations are discussed and described in greater detail below.

In some examples, an array of discrete light sources suitably arranged about the DUT may provide the darkfield illumination, either by lighting one, some, or all in a time sequence or by lighting all simultaneously. In some examples, the light sources are disposed in a roughly circular pattern and/or other shape or array on an attachment to the microscope, where the optical axis of the microscope is roughly at the center of the roughly circular pattern and/or other shape or array of light sources. In the present disclosure, such an array of discrete light sources may be referred to as the "light ring."

According to examples of the present disclosure, the light ring may be employed alone and/or may be employed with a "redirection ring," an optical element which redirects the light from the light ring to provide darkfield illumination of the DUT at a suitable/appropriate AOI. In various examples, the redirection ring may be a reflective ring and/or a refractive ring. As shown and described in great detail below, the terms "light ring," "redirection ring," "reflective ring," "refractive ring," "reflector ring," "refractor ring," etc., herein may not always refer to objects/components that take the form of a ring or circle.

In some examples, the "light ring" may be implemented as a circular pattern of light sources disposed on a flat rectangular board or other shape. As used herein, "circular pattern" may refer to any shape, array, pattern, etc., which roughly and/or sufficiently mimics the even lighting effect of more circular lighting. In some examples, the array of light sources of the "light ring" may take the form of a multi-sided polygon which somewhat mimics the even lighting effect of more circular lighting. For instance, an octagonal shaped array with two discrete light sources on each side may be used as a "light ring" in accordance with the present disclosure.

As used herein, the "redirection ring" may be implemented in any shape, configuration, and/or construction which roughly, sufficiently re-directs the light from the light ring as darkfield illumination of the sample/DUT. In other words, a redirection ring in accordance with the present disclosure is not limited to a circular shape, but rather the redirection ring may sufficiently re-direct the light so as to provide darkfield illumination from more than one point about the sample/DUT. In various examples, the redirection ring may be a reflector ring, a refractor ring, more than one of either or both, or another optical component.

As used herein, the "reflector ring" or "reflective ring" may be implemented in any shape, configuration, and/or construction which roughly, sufficiently reflects the light from the light ring as darkfield illumination of the sample/DUT. A reflector ring in accordance with the present disclosure is not limited to a circular shape, but rather the reflector ring may take any form and/or shape that sufficiently reflects the light so as to provide darkfield illumination from more than one point about the sample/DUT. The reflector ring may be implemented as a circular reflective surface disposed within a rectangular solid metal object. As used herein, such a "circular reflective surface" may refer to any roughly circular shape, including, for example, a multi-sided roughly polygonal shape which roughly and/or sufficiently mimics the even lighting effect of more circular reflective surface.

As used herein, the "refractor ring" or "refractive ring" may be implemented in any shape, configuration, and/or construction which roughly, sufficiently refracts the light from the light ring as darkfield illumination of the sample/ DUT. A refractor ring in accordance with the present disclosure is not limited to a circular shape, but rather the reflector ring may take any form and/or shape that sufficiently refracts the light so as to provide darkfield illumination from more than one point about the sample/DUT. In some examples, the refractor ring may be implemented as a refractive body disposed so that it effectively refracts sufficient light from the light ring as darkfield illumination of the sample/DUT. In some examples, the refractive body may include any type of optical material. In some examples, the refractive body may include any type of optical element capable of refracting/bending light to provide sufficient darkfield illumination, including, e.g., a glass wedge, a diffractive optical element (DOE), a Fresnel-type lens, etc., as would be understood by one of ordinary skill in the art.

As mentioned above, one, some, and/or all of the light sources may be lit in a time sequence to assist in the inspection of the DUT. In some examples, digital signal processing or a similar technique may be used to highlight and/or otherwise further identify/separate out particulate matter, cleanable particulate matter, imperfections/defects, etc., as would be understood by one of ordinary skill in the art.

Some advantages and benefits of the devices, systems, and methods described herein are readily apparent. For example, because the light sources on the light ring may be independently addressable and thus individually controllable, a wide variety of lighting patterns and time-varying effects may be achievable. As another example, having a series of darkfield images of the end connector under varying lighting conditions produces shadows which enhance the ability to identify particulate matter, defects/ imperfections, and to determine whether particulate matter is cleanable, etc. Other benefits and advantages are described in greater detail below, and additional benefits and advantages may be apparent to one of ordinary skill in the art but not specifically discussed herein.

The two most common lighting techniques which may be used for the inspection/observation of end connectors for fiber optics are brightfield illumination, which is more common and, roughly speaking, lights the sample up with a direct beam of light, and darkfield illumination, which is less common and, roughly speaking, lights the sample up with indirect light from the side(s) of the sample. Both of these are described and explained in greater detail in reference to FIGS. 1A-1C (brightfield) and FIGS. 2A-2C (darkfield) below. However, it should be observed there are other lighting techniques, such as, for example, Differential Interference Contrast (DIC) and polarized light observation (PO), which may be used in conjunction with examples of the present disclosure under certain circumstances, as would be understood by one of ordinary skill in the art.

FIGS. 1A-1C illustrate brightfield illumination and FIG. 2A-2C illustrate darkfield illumination. More specifically, FIGS. 1A and 2A illustrate block diagrams of a microscope 110 viewing an end connector 125 of a fiber optic cable 120 in a mount 130 of the microscope 110. As shown in FIG. 1A, in brightfield illumination (which hereinafter may also be referred to simply as "brightfield"), a light source (not shown) delivers the light 115 axially, i.e., along the optical axis of the microscope 110 (and, in this case, through the microscope 110 itself), colinearly with the viewing path of the microscope 110, so that it directly illuminates the end connector 125. This may also be referred to as "directly" and/or "axial delivery."

As shown in FIG. 2A, in darkfield illumination (which hereinafter may also be referred to simply as "darkfield"), the light 213 and 217 from a light source (not shown) may illuminate the end connector 125 from the side(s) (and, in this case, through the microscope 110 itself) not axially and not colinearly with the viewing path of the microscope 110. More specifically, a round patch (also not shown) may be put in the path of a light source so that a cylinder of light continues past that patch and is then re-directed by, e.g., a condenser lens, to illuminate the end connector 125. FIG. 2A provides a cross-sectional view, where the sides 213 and 217 of a cross-sectional slice of the cylinder of light are shown. Accordingly, in this example, the end connector 125 is lit up from all sides at once, i.e., 360°. Although brightfield may be more common (and simpler to implement), darkfield may provide more contrast and thus may be more useful in identifying defects, imperfections, and "dirt" (i.e., particulates on the surface of a sample).

Technically speaking, darkfield illumination delivers light at a greater angle-of-incidence (AOI) or "illumination angle," the angle between the incident light and the perpendicular of the surface of the object being lit (which also corresponds, in this case, with the axis of the viewing path of the microscope 110), than brightfield illumination, as discussed in more detail below. One way of understanding darkfield illumination is that the specular reflection, i.e., the direct mirror-like reflection, of the darkfield light source is not directly captured by the microscope objective from the sample, but rather the light "scattered" from the sample, i.e., the indirect, diffuse reflection of light from the sample. Typically, such light scattering may result in a reversal of image polarity (which may result in, e.g., a color inversion) of the captured light.

FIGS. 1B and 2B show a simplex end connector of a fiber optic cable lit up by brightfield illumination and darkfield illumination, respectively. As shown in FIG. 1B, certain particulate matter is dark (i.e., reflected light of the axial incoming light on the particulate matter is scattered away from the objective lens of the microscope 110, hence it forms a dark spot) under brightfield illumination. By contrast, as shown in FIG. 2B, the particulate matter (or "dirt") is white, because the scattered light from the particulate matter is reflected towards the objective lens of the microscope 110. However, because the simplex end connector in FIG. 2B is lit up from all sides, the image produced is relatively flat—i.e., it does not have any shadows, and thus does not provide much contrast to detect particulate matter.

FIGS. 1C and 2C show an MPO end connector of a fiber optic cable lit up by brightfield illumination and darkfield illumination, respectively. FIG. 1C shows many details of ferrule surface of the MPO end connector; however, identifying particulate matter on the ferrule surface of the MPO end connector may be more difficult. By contrast, FIG. 2C shows relatively little detail of the ferrule surface of the same MPO end connector, but does show many little bits of particulate (as white dots) on the ferrule surface of the MPO end connector. Similar to FIG. 2B, the darkfield image in FIG. 2C is relatively flat when the darkfield illumination is simultaneously from all sides, i.e., 360°.

Accordingly, under current typical microscopy methods for the inspection of end connectors, there may be difficulties in determining whether the end connector is clean or dirty (i.e., whether its ferrule surface has particulate matter or not). Moreover, if the end connector is dirty, there may be difficulties determining whether or not the end connector is, in fact, cleanable. In cases where the end connector may be polished and reconditioned, there may be difficulties determining whether the end connector should be cleaned or polished. In short, more diagnostic information and/or analysis may be desirable in the field of inspection by microscopy of end connectors of fiber optic cable.

According to examples of the present disclosure, a system for oblique lighting may include a circular array of light sources in a planar light ring that provides darkfield illumination of an end connector under inspection by a microscope and a controller to control each of the plurality of light sources to light in a time sequence as an imager captures a series of images, and to analyze the captured series of images to identify surface particulates on, and other possible defects/imperfections and/or features of, the end connector. In some examples, the controller may further determine whether any identified surface particulates are cleanable and/or provide feedback either identifying any identified surface particulates or identifying any identified surface particulates that are cleanable. In some examples, the darkfield technique may be employed to detect scratches, pits, hillocks, and other defects and/or imperfections in the ferrule surface, as well as defects and/or imperfections in the overall structure of the end connector (such as defects/imperfections in, e.g., pin height, pin holes, and other structural features). Accordingly, the terms "defect" and/or "imperfection" as used in context herein may include, for example, dirt or surface particulate matter, scratches, pits, hillocks, organic matter (such as, e.g., grease or oil), and/or any deviations from any specified dimensions/qualities of the end connector (e.g., pin height, pin hole width and depth, and/or any other features/qualities of the structure of the end connector), as would be understood by one of ordinary skill in the art. In some examples, the controller may further determine and/or identify any defects and/or imperfections and/or provide feedback regarding any identified defect and/or imperfection.

According to examples of the present disclosure, a system for oblique lighting may provide a suitable/appropriate AOI for darkfield illumination of an end connector in a microscopic inspection system. The specular reflections or scattering of the light from darkfield illumination effectively illuminates defects, imperfections, and/or other qualities/features of the end connector, which may be further accentuated by a polarity inversion (i.e., color inversion) which is not produced by, for example, brightfield illumination.

According to examples, a system for oblique lighting may include a light ring alone to provide an appropriate/suitable AOI for darkfield illumination, or a combination of a light ring and a redirection ring which redirects a sufficient amount of the light emitted by the light ring to provide darkfield illumination suitable for inspecting an end connector. In some examples, the redirection ring may be a reflective ring which reflects a sufficient amount of the light from the light ring at a suitable/appropriate AOI to provide sufficient darkfield illumination. In some examples, the redirection ring may be a refractive ring which refracts a sufficient amount of the light from the light ring at a suitable/appropriate AOI to provide sufficient darkfield illumination. Examples of a light ring with a reflective ring employed as a redirection ring are discussed in reference to FIGS. 3A-3C, 4, 5, and 6A-6D below. Examples of a light ring with a refractive ring employed as a redirection ring are discussed in reference to FIGS. 7A-7D below. Examples of a light ring without a redirection ring are discussed in reference to the example shown in FIGS. 8A-8D.

In some examples, any number of light rings and redirection rings may be employed to achieve an appropriate/suitable AOI for darkfield illumination of the end connector. In some examples, a mixture of types of redirection rings may be employed, e.g., using both one or more refractive rings and one or more reflective rings. As explained herein and shown in some of the examples below, the light ring and/or redirection ring may not necessarily take a circular/round form.

As discussed herein and shown in some of the examples below, the light ring and/or possibly the redirection ring may be detachably and/or permanently attached to a portion of the microscopic inspection system. As discussed herein and shown in some of the examples below, the light ring and redirection ring may be directly attached to each other (FIGS. 3A-3C and 7A-7D), or each may be separately directly attached to the microscope (FIGS. 6A-6D). In some examples, the light ring and/or the redirection ring may be bonded to a portion of the microscopic inspection system. In some examples, the light ring and/or the redirection ring may be detachably and/or permanently attached to a portion of the microscopic inspection system by a frictional connection (such as, e.g., complementary threading, press fitting of the ring(s) into a recessed portion of the microscopic imaging system, clamping of the ring(s) around a portion of the microscopic imaging system).

According to examples of the present disclosure, an oblique lighting system for inspection, under a microscope, of an end connector of a fiber optic cable may include a light ring comprising a plurality of light sources disposed on a planar ring parallel to a plane of an objective lens of the microscope, wherein a center of the planar ring roughly coincides with a viewing axis of the microscope; and a reflector ring comprising an inner reflective surface to receive light from the plurality of light sources disposed on the light ring and to reflect the received light onto the end connector with an angle of incidence (AOI) sufficient to produce darkfield illumination. In some examples, the slope of the inner reflective surface of the reflector ring has the shape of a conic section.

According to examples of the present disclosure, a method for inspecting, under a microscope, an end connector of a fiber optic cable may include lighting each of a multitude of light sources in a light ring separately in a time sequence, thereby providing darkfield illumination to the end connector; capturing a series of images where each image corresponds to when one of the plurality of light sources is lit up; analyzing the captured series of images to identify surface particulates on the end connector; and, if any surface particulates are identified, determining whether they are cleanable—i.e., removable by cleaning the end connector.

In accordance with the present disclosure, the appropriate/suitable AOI for darkfield illumination may be provided by the appropriate disposition of the one or more components of the particular implementation of the present disclosure. In some examples, the appropriate disposition for an appropriate/suitable AOI for darkfield illumination according to the present disclosure may be obtained by considering: (1) the properties of the objective lens of the microscopic inspection system (including, for example, the diameter); (2) the properties of the light ring (including, for example, its positioning relative to the sample/DUT and the properties of each of the light sources in the array of light sources); and (3) the working distance (WD) of the microscopic inspection system (i.e., the distance from the objective lens to the sample/DUT which, in this case, is an end connector of a fiber optic cable).

In some examples, the diameter of the objective lens may affect the size (i.e., diameter/circumference) of the light ring and/or the redirection ring—e.g., the larger the objective lens diameter, the larger the diameter of the light and/or redirection ring. Moreover, this may also affect the number of light sources sufficient to provide adequate lighting for the darkfield illumination of the sample/DUT. In some examples, the properties of the light ring may affect its relative position and/or comportment relative to the sample/DUT and the microscopic inspection system. For instance, the properties of the individual light sources in the circular array of light its sources may affect positioning/comportment—e.g., the directionality of the individual light sources (the emission angle, the targeting of the chief ray, etc.), the intensity profile(s), the power/energy requirement(s), the mechanical requirement(s) (e.g., size, method of attachment, means of receiving power, etc.), and other such factors may affect, for example, the number of light sources, the positioning of the individual light sources on the light ring, whether a redirection ring may be beneficially employed in the particular implementation (and whether a reflective or refractive ring may be more appropriate), the positioning of the light ring relative to the sample/DUT, etc., as would be understood by one of ordinary skill in the art. In some examples, the WD may affect the size, positioning, and relative comportment of the light ring, whether a redirection ring may be beneficially employed (and whether a reflective or refractive ring may be more appropriate), the positioning of the light ring relative to the sample/DUT, etc., as would be understood by one of ordinary skill in the art. Details of specific examples are discussed and described below. For instance, FIG. 7D provides a specific example of providing an appropriate/suitable AOI for darkfield illumination at different locations for the light ring when the WD=7.5 mm.

In some examples, the light ring alone may provide a suitable/appropriate AOI to provide darkfield illumination to the sample/DUT. In other words, the light sources of the light ring may be positioned such that they provide the desired AOI without employing a redirection ring. For instance, FIGS. 6A-6D provide a specific example of a light ring providing suitable/appropriate AOI without a redirection ring.

In some examples, one, some, and/or all of the light sources may be lit in a time sequence to enhance the ability to inspect the DUT, as discussed in greater detail further below. In some examples, darkfield illumination may be combined with one or more other types of illumination, such as, e.g., brightfield, Differential Interference Contrast (DIC), and/or polarized light observation (PO), when, for example, the different types of illumination complement each other by their relative strengths and weaknesses (as also discussed in further detail below).

As mentioned above, FIGS. 3A-3C, 4, 5, and 6A-6D discuss and describe examples of a light ring with a reflective ring employed as a redirection ring; FIGS. 7A-7D discuss and describe examples of a light ring with a refractor ring employed as a redirection ring; and FIGS. 8A-8D discuss and describe examples of a light ring without a redirection ring.

Figures 3A, 3B, 3C:
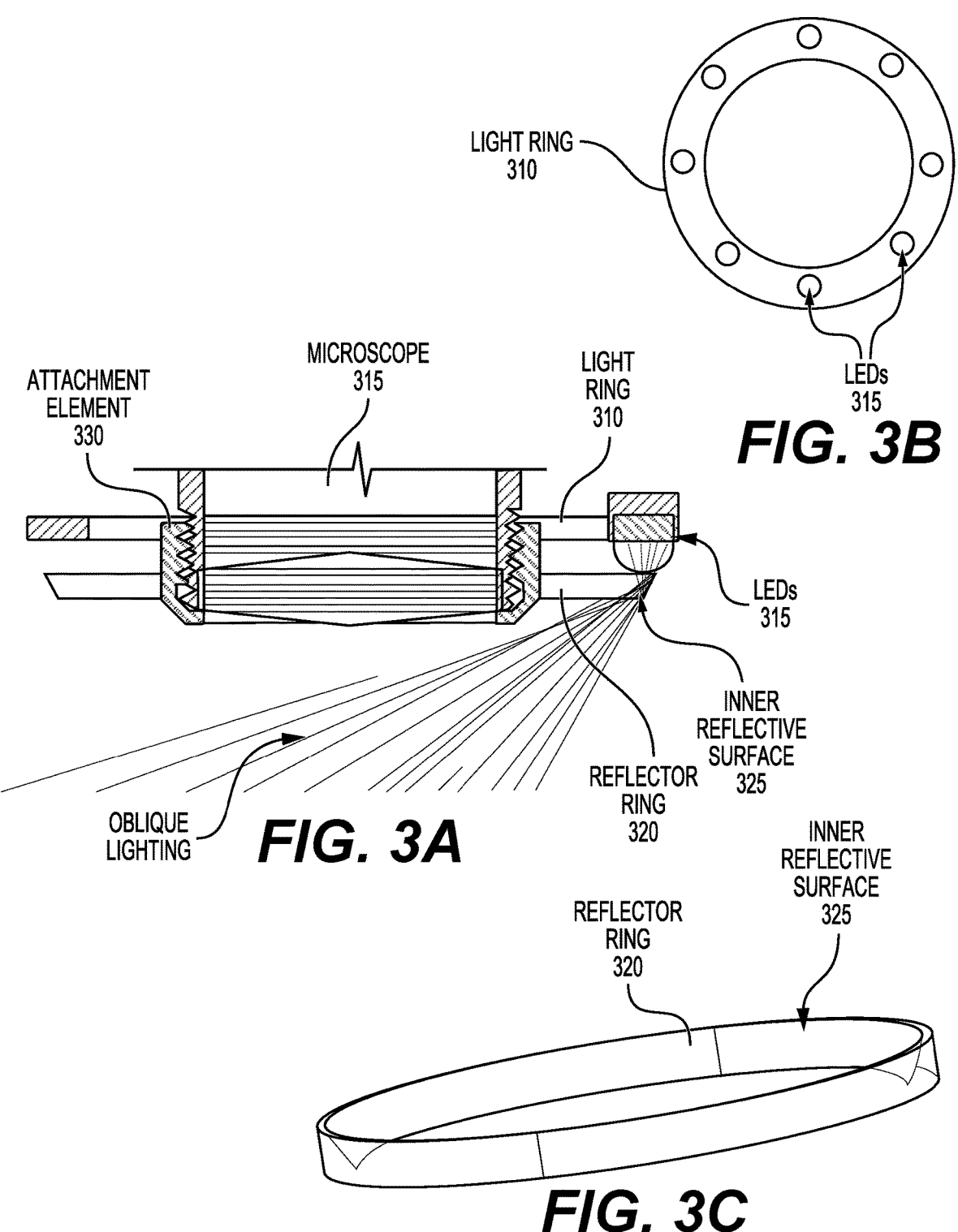
FIGS. 3A, 3B, and 3C are various views of an oblique lighting system having a light ring and a reflective ring employed as a redirection ring, according to an example of the present disclosure.

FIG. 3A illustrates a cross-sectional view of an oblique lighting system of a device under test (DUT—not shown), e.g., an end connector of a fiber optic cable, according to an example of the present disclosure. As shown in FIG. 3A, the objective end of a microscope 305 has the oblique lighting system attached to it, namely: a light ring 310, a reflector ring 320, and an attachment element 330 detachably connecting the oblique lighting system to the microscope 305. The attachment element 330 may be made from any suitable solid material, such as metal, and, in this example, may be attached to the microscope 305 by means of threading on both an internal surface of the attachment element 330 and threading on the outside surface of the microscope 305—i.e., the attachment element 330 is screwed onto the end of microscope 305. In other examples, other forms of detachable attachment or even possibly permanent attachment may be employed, such as another type of friction connection, as would be understood by one of ordinary skill in the art.

As shown in FIG. 3A, the light ring 310 and the reflector ring 320 may be rigidly and permanently connected to the attachment element 330, thereby guaranteeing that the light ring 310 and the reflector ring 320 maintain a suitable spatial relationship to each other such that the light from the light sources disposed on the light ring reflects from an inner reflective surface 325 of the reflector ring 320 onto the DUT. In FIG. 3A, the light ring 310 may have a flat circular shape with one or more light emitting diodes (LEDs) 315 disposed on the bottom surface—only one LED is shown in FIG. 3A for convenience and purposes of illustration; however, an oblique lighting system according to examples of the present disclosure may have a multitude of LEDs such that multiple light sources may illuminate the DUT from multiple directions, such as shown in FIG. 3B.

FIG. 3B is a planar view of the light ring 310 from FIG. 3A, where eight LEDs 315 are disposed on the bottom surface of the light ring 310. The LEDs 315 may be organic LEDs (OLEDs) or any other suitable type of LED, as would be understood by one of ordinary skill in the art.

Figure 5:
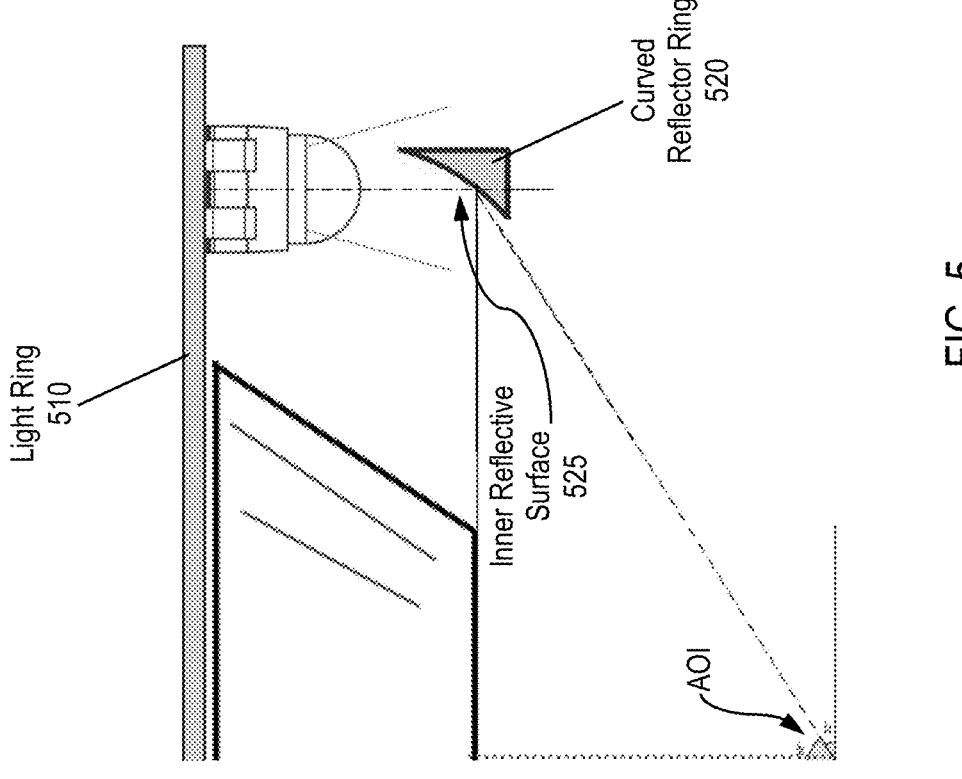
FIGS. 4 and 5 are cross-sectional views of flat reflector ring and a curved/spherical reflector ring, respectively, according to examples of the present disclosure.
Figure 4:
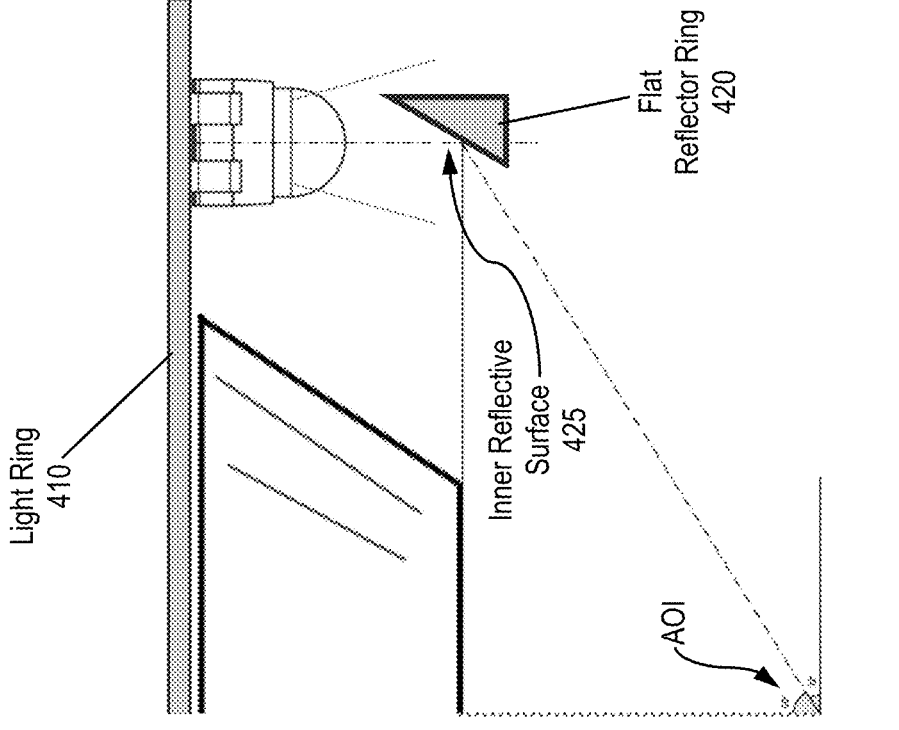

FIG. 3C is a perspective view of the reflector ring 320 from FIG. 3A. As shown in FIG. 3A, light from the one or more LEDs 315 reflects from the inner reflective surface 325 of the reflector ring 320 forming oblique lighting which provides darkfield illumination of the DUT (not shown). As discussed in more detail below, the inner reflective surface 325 may form a flat straight surface (as shown in FIG. 4), a rounded surface (as shown in FIG. 5), and/or any other contoured surface, whether regular or irregular, uniform or having a contour which changes progressively or discretely over different portions of the inner reflective surface 325, as long as the inner reflective surface may provide suitable darkfield illumination to the DUT, as would be understood by one of ordinary skill in the art.

It should be appreciated that, in the example shown in FIGS. 3A-3C, the LEDs 315 are disposed normal to the flat plane of the light ring 310, which may be disadvantageous as only a portion of the light radiated from the LEDs 315 may actually shine on the center of the field of view of the microscope 305, or, equivalently, on the DUT being inspected under the microscope 305. Thus, the reflector ring 320 may be disposed separately beneath the light ring 310 such that the light from the light sources of the light ring 310 may be redirected and focused so that it shines towards the DUT being inspected by the microscope 305. In such examples (where the reflector ring 320 redirects the light from the light ring 310 so that it shines towards the DUT), the light ring 310 and its LEDs may be manufactured relatively simply and inexpensively, at least because the LEDs 315 may be mounted directly onto, for example, a printed circuit board (PCB), thereby reducing the costs and complexities of production. In other words, a suitable AOI for the darkfield illumination of the DUT may be produced by the reflector ring 320, which may also be manufactured as a simple band of metal, without requiring a more complex construction/configuration of the light ring itself in order to ensure an appropriate, effective, and/or suitable AOI for the darkfield illumination of the DUT.

Some examples may employ a more complex construction of the light ring, without the use of a reflector ring to redirect and focus the light at a suitable AOI, as discussed below in reference to FIGS. 7A-7D and FIGS. 8A-8D. Accordingly, examples of the present disclosure may be implemented in a wide variety of configurations/constructions, as would be understood by one of ordinary skill in the art, as long as a suitable AOI may be provided by a suitably positioned array of light sources, each of which may be individually addressable/controllable such that light sequences/patterns may be created (as described in further detail below). Examples of the present disclosure are in no way limited by the specific implementations, configurations, and constructions shown and described in relation to the FIGS. herein.

As mentioned above, in the example shown in FIGS. 3A-3C, the shape/slope/contour of the inner reflective surface 325 of the reflector ring 320 may take a wide variety of shapes. FIGS. 4 and 5 are cross-sectional views of oblique lighting systems similar to the example in FIGS. 3A-3C, but illustrating two different possible slopes/contours for the inner reflective surface 325 of the reflector ring 320.

FIG. 4 is a cross-sectional view of an oblique lighting system using a flat reflector ring according to an example of the present disclosure, while FIG. 5 is a cross-sectional view of an oblique lighting system using a curved reflector ring according to an example of the present disclosure. More specifically, the oblique lighting system in FIG. 4 includes a light ring 410 and a flat reflector ring 420—i.e., whose inner reflective surface 425 has a straight/flat slope, while FIG. 5 includes a substantially similar light ring 510 and a curved reflector ring 520—i.e., whose inner reflective surface 525 has a spherical slope. In some examples, a curved reflector ring like the curved reflector ring 520 in FIG. 5 may be more effective at providing greater luminescent intensity and power to the object under inspection at the optical axis of the microscope. Although referred to as a spherical slope in FIG. 5, the contour of the inner reflective surface 525 may be more accurately but generally referred to as a conic section—i.e., in geometry, any curve obtained by a cone's surface intersecting a plane, most commonly broken down into parabolic, hyperbolic, and elliptical curves (where a circular/spherical curve is a specific type of an elliptical curve). As would be understood by one of ordinary skill in the art, the curve/slope/contour of the inner reflective surface may be non-uniform in some examples, i.e., having a different curve/slope/contour at different portions of the inner reflective surface.

FIGS. 4 and 5 also illustrate the angle-of-incidence (AOI) defined as the angle between the incident light reflected from the reflector ring (indicated by the dot-dash line) and the optical axis of the microscope (indicated by the dotted line), under which the object is typically roughly centered for best viewing. As discussed above, generally speaking, an appropriate/suitable AOI according to examples of the present disclosure may be provided by considering: (1) the diameter of the objective lens; (2) the properties of the light ring and its light sources; and (3) the working distance (WD) of the microscopic inspection system. For instance, as discussed in detail below (in reference to FIGS. 7A and 7D), the suitable/appropriate AOI according to examples of the present disclosure may vary based on, e.g., the positioning of the light ring in relation to the DUT-specifically, for instance, the distance between the light sources disposed in the light ring and the sample/DUT may depend, at least in part, on the WD of the particular microscopic inspection system.

As would be understood by one of ordinary skill in the art, the shapes, sizes, relative locations, etc., of the components in FIGS. 3A-3C, 4, and 5 may not be accurate and/or in proper proportions, but are merely shown for purposes of illustrating and explaining, e.g., the use and purpose of the inner reflective surface of the reflector ring. In some examples, the bottom of the reflector ring may be roughly parallel with the bottom and/or objective lens of the microscope (such as the reflector ring in FIGS. 3A-3C above and FIGS. 6A-6D below); in some examples, the reflector ring may be at a different location relative to the light sources and/or the light ring (i.e., up, down, or sideways) and/or have a different size, width, and/or circumference (thus having a different reflective geometry than shown in FIGS. 3A-3C, 4, and 5). In some examples, the reflective ring is not a "ring" at all—i.e., while the inner reflective surface may have a somewhat circular shape in the plane around the microscope (perpendicular to the optical axis), the rest of the "ring" may be square/rectangular (as in FIGS. 6A-6D below) and/or any size/shape suitable for the particular implementation of an oblique lighting system according to examples of the present disclosure in relation to the specific dimensions/construction of the particular microscope involved, as would be understood by one of ordinary skill in the art.

Figures 6A, 6B, 6C, 6D:
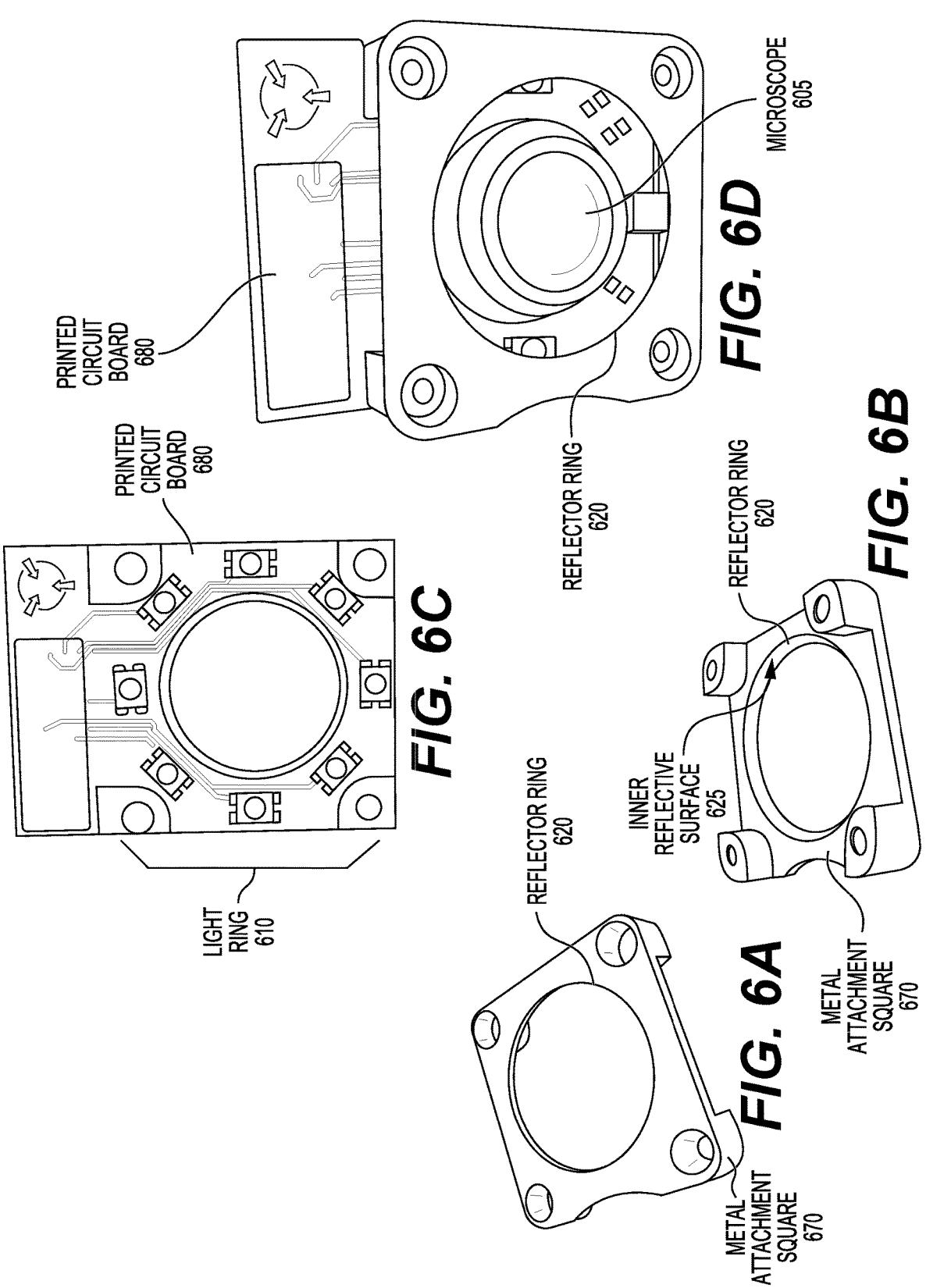
FIGS. 6A, 6B, 6C and 6D are images of an oblique lighting system having a light ring and a reflective ring employed as a redirection ring, according to an example of the present disclosure.

FIGS. 6A-6D are images of an oblique lighting system having a reflector ring employed as a redirection ring according to an example of the present disclosure. More specifically, FIGS. 6A and 6B are images of the bottom and top, respectively, of a metal attachment square 670 in which a reflector ring 620 is formed as a circular hole in the center, and an inner reflective surface 625 is formed as the inside of the circular hole, as shown in FIG. 6B. The metal attachment square 670 (within which the reflector ring 620 is disposed) may be attached to a microscope by means of screws/bolts which pass through holes located at the four corners of the metal attachment square 670. FIG. 6C is an image of a printed circuit board (PCB) 680 upon which 8 LEDS form a light ring 610 around a circular hole. Like the metal attachment square 670 in FIGS. 6A-6B, the PCB 680 in FIG. 6C also has four holes through which screws/bolts may pass in order to affix the PCB 680 between the microscope and the metal attachment square 670. FIG. 6D is an image of the bottom of a microscope 605 to which the oblique lighting system is attached by means of bolts through the four holes in the metal attachment square 670 and the four holes of the PCB 680.

FIGS. 7A-7D are block diagrams illustrating an oblique light system which uses a light ring with a refractor ring employed as a redirection ring, according to an example of the present disclosure. In some examples, a refractor ring may be employed as a redirection ring, either attached/connected directly to the light ring (as the example in FIGS. 7A and 7D) or possibly disposed apart from the light ring (similarly to the reflector ring 320 in FIGS. 3A-3C, 4, 5, and 6A-6D). In some examples, the refractor ring may be configured to promote internal reflection; in other examples, the refractor ring may not be configured to promote internal reflection.

Figure 7A:
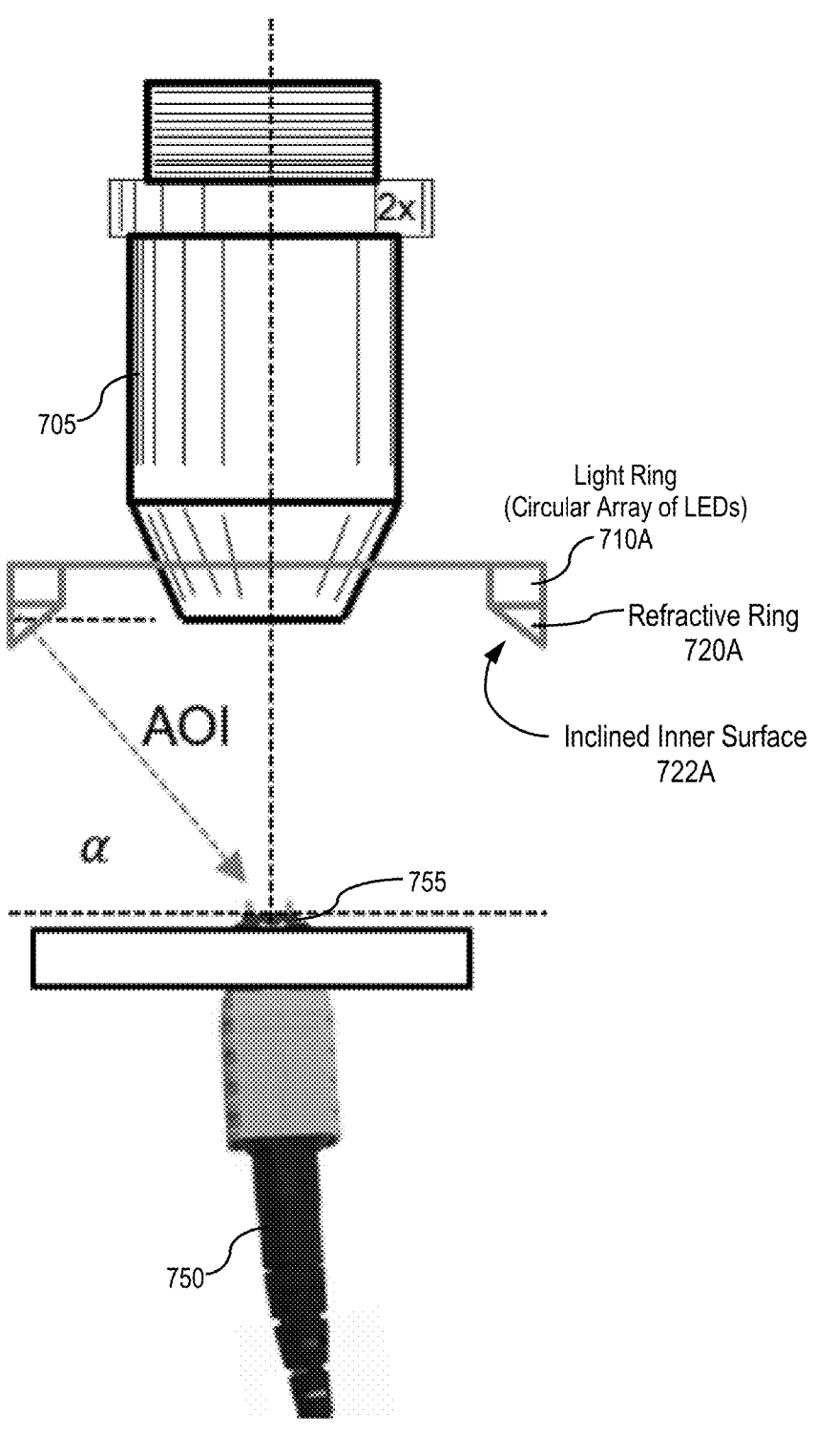
FIGS. 7A, 7B, 7C, and 7D are block diagrams illustrating an oblique light system which has a light ring and a refractor ring employed as a redirection ring, according to an example of the present disclosure.
Figures 7B, 7C, 7D:
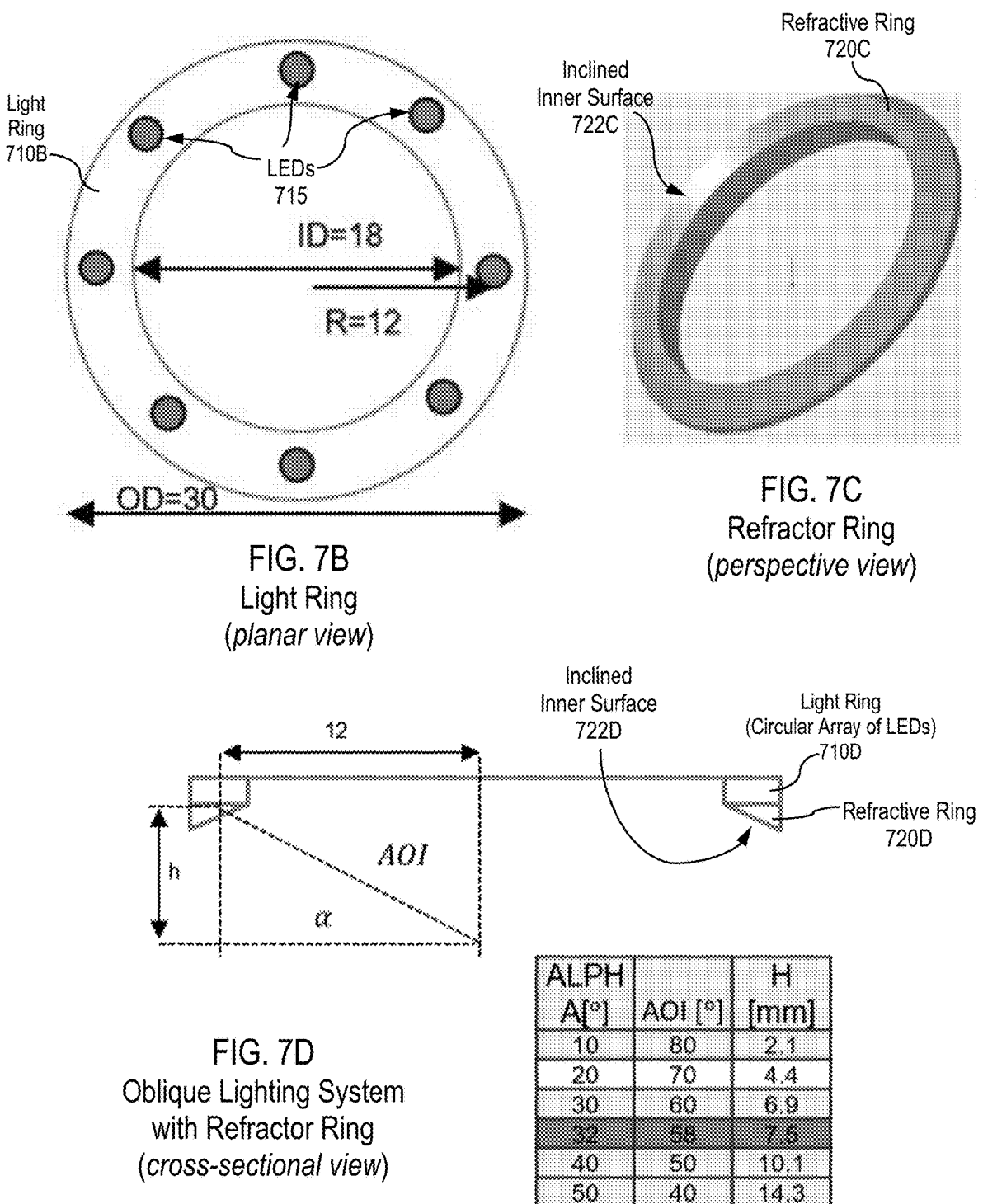

More specifically, FIG. 7A is a block diagram of a cross-section of a microscope 705 inspecting an end connector 755 of a fiber optic cable 750. A light ring 710A is attached near to the end of the microscope 705 and may be connected/attached to a refractor ring 720A with an inclined inner surface 722A which projects light towards the end connector 755. A multitude of light sources (not shown in FIG. 7A) may be disposed within the light ring 710A, as shown in FIG. 7B. As shown in FIG. 7A, the inclined inner surface 722A of the refractor ring 720A may be formed at an angle to the plane of the light ring 710A such that the light from any light sources disposed within the light ring 710 may be directed mostly at the end connector 755 under inspection. As mentioned above, the light ring 710A may be detachably and/or permanently attached to a portion of the microscope 705 by a frictional connection (such as, e.g., complementary threading where the light ring 710A is threaded onto an externally-threaded objective portion of the microscope 705 or an externally-threaded sleeve around the microscope 705; press fitting of the ring(s) into a recessed portion of the microscopic imaging system; clamping of the ring(s) around a portion of the microscopic imaging system, etc.), as would be understood by one of ordinary skill in the art.

FIG. 7B is a planar view of the light ring 710B showing where the individual light sources may be disposed within. Generally speaking, a light ring according to the present disclosure may have 4 or less up to 16 or more light sources, depending upon the design specifications and specific details of the particular microscopic inspection system. In FIG. 7B, eight (8) LEDs 715 may be mounted within the light ring 710B. As shown in FIG. 7B, the outer diameter (OD) of the light ring 710B may be 30 mm, the interior diameter (ID) may be 18 mm, i.e., the size of the objective in microscope 705, and the length from the center of the light ring 710B to the center of each of the LEDs 715 may be 12 mm. As would be understood by one of ordinary skill in the art, these specific measurements are merely exemplary, and examples of the present disclosure are in no way limited by these measurements nor any of the details in FIGS. 7A-7D or any of the other drawings.

FIG. 7C is a perspective view of the refractor ring 720C with the inclined inner surface 722C. In some examples, the refractor ring 720C may be a refractive body which may include any type of optical element capable of refracting/bending light to provide a suitable/appropriate AOI, including, e.g., a glass wedge, a diffractive optical element (DOE), a Fresnel-type lens, etc., as would be understood by one of ordinary skill in the art. In some examples, the refractor ring 720C may a refractive body mounted and/or bonded to the light ring 710 by an optical adhesive, epoxy, glue, and/or cement. In some examples, the refractor ring 720C may be attached to the light ring 710 by a frictional connection (e.g., clamping, press fitting, complementary threading, etc.). In some examples, the refractive body of the refractor ring 720C may not be in the shape or form of a ring or other roughly circular shape, but may take any form or shape capable of refracting/bending light to provide a suitable/appropriate AOI.

FIG. 7D is a block diagram of a cross-section of the light ring 710D and a refractor ring 720D with a table indicating suitable AOI for different heights (h) of an inner inclined surface 722D of the refractor ring 720D above the horizontal plane of the DUT—i.e., the end connector 755. As an initial matter, it should be noted the inclined inner surface 722D of the refractor ring 720D is shown incorrectly in FIG. 7D, as would be understood by one of ordinary skill in the art, because the inclined inner surface 722D should be perpendicular to the desired incident light path (indicated by the diagonal dashed line in FIG. 7D) to the DUT, thereby achieving the desired AOI, as correctly shown in FIG. 7A. Moreover, the relative contours of the refractor ring 720C in FIG. 7C may not appear to match the cross-sectional view of the refractor ring 720A in FIG. 7A, just as the relative widths of the light ring 710B in FIG. 7B may not appear to correspond exactly with the light ring 710A in FIG. 7A. However, the purpose of FIGS. 7A-7D is to illustrate a certain category of construction using a refractor ring as a redirection ring according to examples of the present disclosure. Generally speaking, the shapes, sizes, relative locations, etc., of the components shown in FIGS. 7A-7D may not be accurate and/or in proper proportions, but are shown merely for purposes of illustration and explanation, as would be understood by one of ordinary skill in the art.

As mentioned above, a suitable/approximate AOI for darkfield illumination according to examples of the present disclosure may be achieved by providing a light ring and possibly a redirection ring which may bend/shape/project the chief ray of the light sources to roughly the center of the sample/DUT, given the other parameters of the specific microscopic inspection system. In some examples, a suitable/appropriate AOI may depend upon: (1) the properties of the objective lens (including, e.g., the diameter); (2) the properties of the light ring and its light sources; and (3) the WD (i.e., the distance from the objective lens to the sample/DUT which, in this case, is an end connector of a fiber optic cable). In some examples, an initial consideration are the mechanical constraints. The diameter of the objective practically sets the minimum lateral location of the array of light sources in the light ring (e.g., the diameter of the circular LED array as shown in FIG. 7B). In some examples, there also may be the constraints of a maximum LED circular diameter and the emission angle of the LEDs themselves. In some examples, the WD may be fixed, thereby fixing/setting the distance from the objective lens to the sample/DUT. All of these constraints may work together to determine a suitable/appropriate AOI for darkfield illumination according to examples of the present disclosure. Broadly speaking, the minimum AOI may be selected which will cause the chief ray of the LED(s) to fall on roughly the center of the sample/DUT, and provide darkfield illumination. While this design goal (i.e., selecting the minimum AOI which may ensure that the chief rays are placed at roughly the center of the sample/DUT) may provide a suitable/appropriate AOI in some examples, in other examples, the AOI may be further increased to provide a suitable/appropriate AOI by, for example, moving the light sources further laterally out away from the microscopic inspection system (e.g., increasing the diameter of the light ring).

As indicated in FIG. 7D, the suitable/appropriate AOI may vary as the height of the light ring 710D above the plane of the sample/DUT (e.g., the end connector 755 in FIG. 7A) varies. Broadly speaking, many microscopic inspection systems may work at only one WD and thus FIG. 7A merely shows that how the suitable/appropriate AOI may vary for different WDs (or different heights "h" in FIG. 7D). For example, for a height h of 7.5 mm, a suitable/appropriate AOI may be 58°; for a height h of 2.1 mm, a suitable/appropriate AOI may be 80°; for a height h of 4.4 mm, a suitable/appropriate AOI may be 70°; for a height h of 6.9 mm, a suitable/appropriate AOI may be 60°; for a height h of 10.1 mm, a suitable/appropriate AOI may be 50°; and for a height h of 14.3 mm, a suitable/appropriate AOI may be 40°. These numbers may approximately work, regardless of the particular construction—for example, the more suitable/appropriate AOI provided by the reflector ring 320 in FIGS. 3A and 3C or the reflector ring 620 in FIGS. 6A-6D would still be in the 53°-63° range or roughly around 58°, even though the light path from the light sources to the DUT may vary according to the implementation of the specific example according to the present disclosure. Moreover, the other value indicated in the diagrams of FIGS. 7A and 7D, alpha $\alpha$, is the complement of the AOI, i.e., adding alpha $\alpha$ to AOI will equal 90°, a right angle. The number alpha $\alpha$ is useful as it is the angle the axis of the light source may make with the plane of the objective lens of the microscope (which is parallel to the horizontal plane of the DUT), as is shown below in reference to FIGS. 8A-8D.

FIGS. 8A-8D are images of an oblique lighting system which has a light ring but no redirection ring, according to an example of the present disclosure. Broadly speaking, in examples without a redirection ring, the light ring may be positioned such that the circular array of light sources directly provide darkfield illumination to the sample/DUT. In some examples, the base of the light ring itself may have an inclined inner surface directed towards the sample/DUT (similar in shape to the inclined inner surface 722A of FIG. 7A or the inclined inner surface 722D of FIG. 7D), and the light sources may be mounted directly on that surface. In some examples, a flexible and/or conical PCB may be employed such that the array of light sources mounted directly thereon may directly provide the darkfield illumination. In some examples, such as the one shown in FIGS. 8A-8D, a flat planar base (such as, e.g., a PCB) may have extensions which support a light ring disposed such that the array of light sources may provide darkfield illumination directly.

Figures 8A, 8B, 8C, 8D:
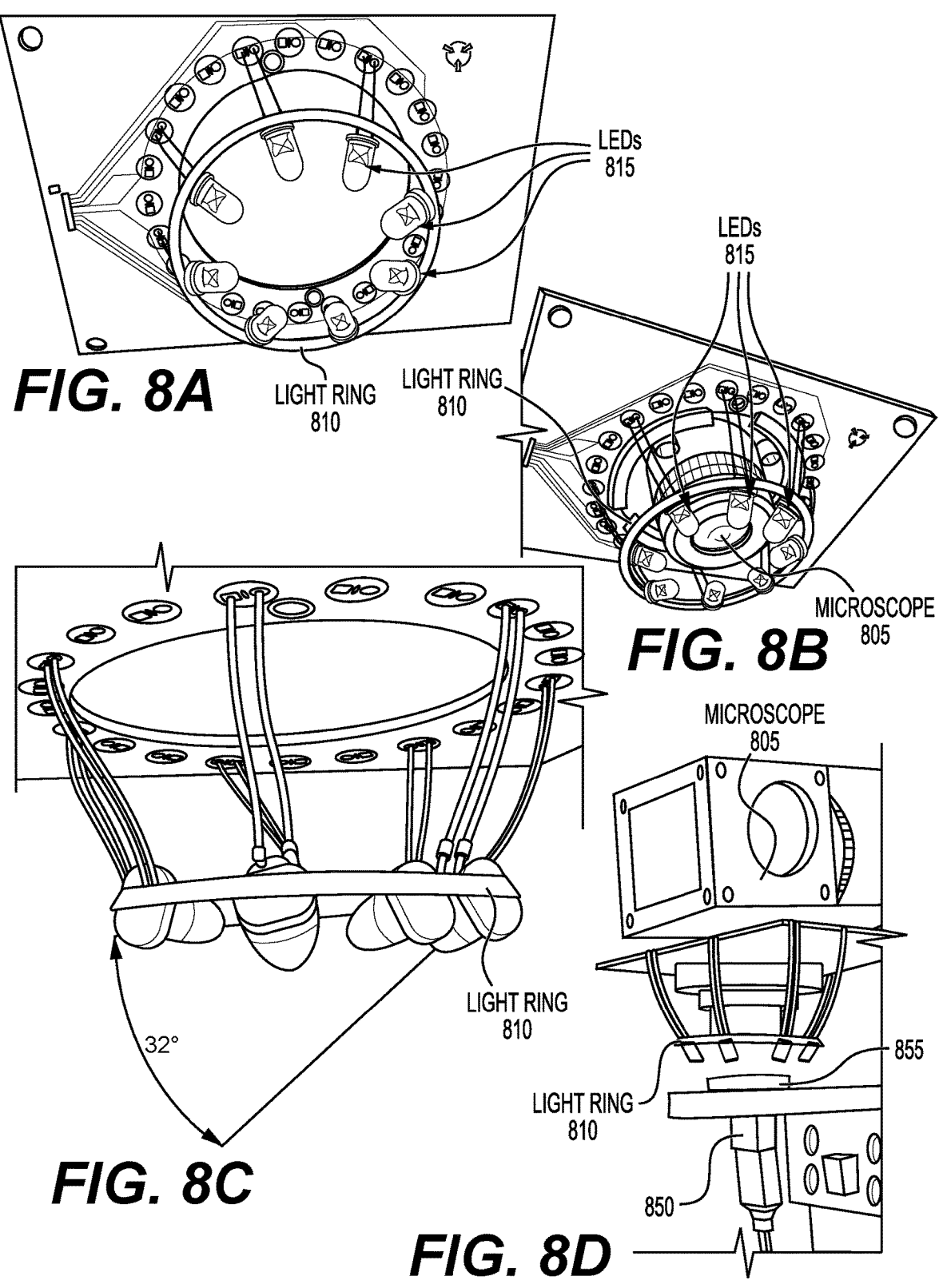
FIGS. 8A, 8B, 8C and 8D are images of an oblique lighting system which has a light ring but no redirection ring, according to an example of the present disclosure.

More specifically, FIG. 8A is a perspective view of the oblique lighting system which includes a light ring 810 on which 8 LEDs 815 are disposed, where the light ring 810 is anchored to, and held above, a circuit board by two leads which connect each of the 8 LEDs 815 (making 16 leads in total) to the circuit board and provide both control signals and power to each of the 8 LEDs 815. The diameter of the light ring 810 is 24 mm and it is positioned above a hole in the circuit board for the microscope. FIG. 8B is a perspective view of the oblique lighting system attached to a microscope 805 by means of the circuit board, thereby centering the light ring 810 around the optical axis of the microscope 805. FIG. 8C is a side view of the light ring 810, illustrating the angle the axis of each of the LEDs 815 makes with the plane of the light ring 810, which is 32°, the alpha $\alpha$ angle complementary to the AOI of 58° which is suitable if the plane of the light sources is about 7.5 mm above the plane of the DUT. FIG. 8D is a side view of the light ring 810 attached by means of the circuit board to the microscope 805, where the 8 LEDs 815 are lit up. As shown in FIG. 8D, a pair of calipers is measuring the distance from the plane of the 8 LEDs 815 to the plane of an end connector 855 of a fiber optic cable 850 being inspected. As previously mentioned, the distance may be roughly 7.5 mm.

As indicated by the wide variety of examples in FIGS. 3A-3C, 4, 5, 6A-6D, 7A-7D, and 8A-8D, examples according to the present disclosure may be implemented in a wide array of possible constructions, as long as a suitable/appropriate AOI for darkfield illumination is provided.

As discussed above, some examples of the present disclosure provide for an oblique lighting system where the light sources may be individually controlled such that lighting patterns may be created which are conducive to the inspection of end connectors. In some examples, the oblique lighting system may have one or more controllers which may be connected to the array of light sources and to one or more cameras or other light sensors which may receive images from the microscope.

Figures 9, 10:
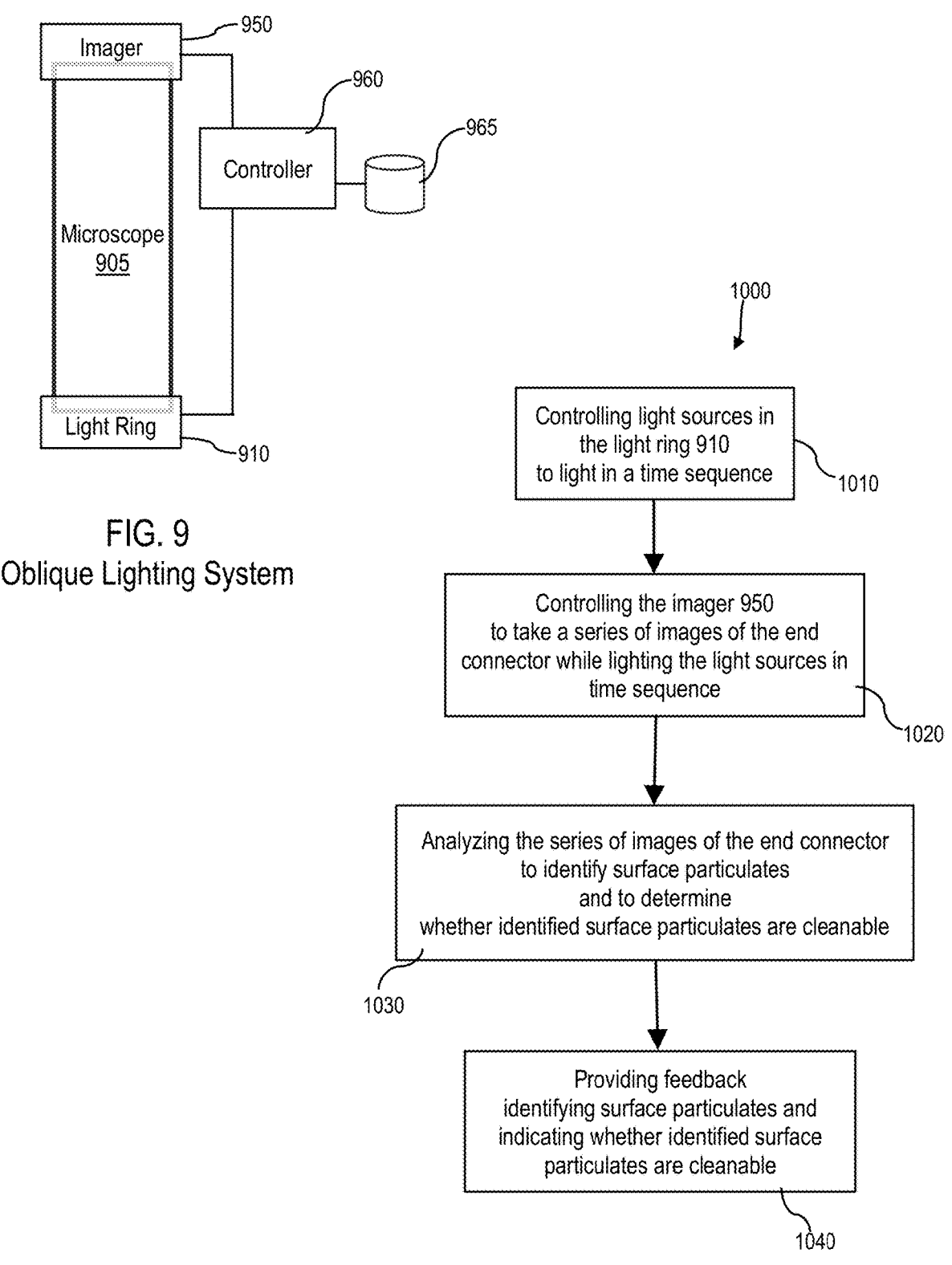
FIG. 9 is a block diagram of an oblique lighting system according to an example of the present disclosure.
FIG. 10 illustrates a flow diagram of a method of visually inspecting an end connector of a fiber optic cable by microscope, according to an example.

FIG. 9 is a block diagram of an oblique lighting system according to an example of the present disclosure. In FIG. 9, a microscope 905 for inspecting DUTs may include a light ring 910 disposed at the objective end of the microscope 905, an imager 950 disposed at the viewing end of the microscope 905, a controller 960 connected to both the imager 950 and the light ring 910, and a storage 965 connected to the controller 960. The controller 960 may control the imager 950 and the light ring 910 by executing instructions which may be stored in the storage 965.

The light ring 910 may be any implementation of a light ring providing darkfield illumination in accordance with the present disclosure, including, for example, a light ring and reflector ring combination (such as shown in FIGS. 3A-3C, 4, 5, and 6A-6D) or a light ring alone (such as shown in FIGS. 7A-7D and 8A-8D). The light ring 910 may include a multitude of discrete light sources disposed in a roughly circular pattern around the optical axis of the microscope 905 and thus may be disposed roughly symmetrically in relation to any DUT being inspected by the microscope 905. In some examples, the multitude of light sources may include one or more light emitting diodes (LEDs) or any other suitable discrete light source, as would be understood by one of ordinary skill in the art. In some examples, the light ring 910 may include one or more light sources, such as, for example, one or more light panels (e.g., liquid crystal display (LCD) panels, a liquid-crystal-on-silicon (LCoS) display panels, organic light-emitting diode (OLED) display panels, micro light-emitting diode (micro-LED) display panels, digital light processing (DLP) display panels, or any other suitable light source in panel form, as would be understood by one of ordinary skill in the art). In some examples, each of the light sources included in the light ring 910 may be individually addressable, and thus individually controllable, by the controller 960.

The imager 950 may include one or more image sensors, cameras, and/or any other device capable of capturing images and/or video in accordance with the present disclosure, as would be understood by one of ordinary skill in the art. In some examples, the imager 950 may be a digital camera which may use one or more semiconductor imaging sensors and may or may not use optics and a variable aperture. In some examples, the optics, aperture, etc., may be effectively replaced by digital signal processing (DSP) of the data received by the semiconductor imaging sensors. In some examples, the imager 950 may be at least one of a charge-coupled device (CCD) or an active pixel sensor, also known as a complementary metal oxide semiconductor (CMOS) sensor. In other examples, the imager 950 may be other forms of metal oxide semiconductor (MOS) based sensors, such as, e.g., an n-type metal oxide semiconductor (nMOS) integrated circuit chip, or a modified metal oxide semiconductor (MOS) dynamic random access memory (RAM) chip.

In some examples, the imager 950 may not be a separate component from the microscope 905, but rather may be implemented in an imager already integrated into the microscope 905 (such as, for example, if the microscope 905 was manufactured with a suitable imager). In some examples, the imager 950 may be part of a separate oblique lighting system (including the light ring 910) which may be connected and/or attached to the microscope 905 for usage/implementation. In some examples, the imager 950 may take single images, series of images, video, and/or other forms of imaging suitable for examples of the present disclosure, as would be understood by one of ordinary skill in the art. Like the light sources on the light ring 910, the imager 950 may be addressable and controllable by the controller 960.

The controller 960 may receive input, store, and process data, and/or control the imager 950 and/or the light sources of the light ring 910 in accordance with received input, stored/processed data, and/or executable instructions stored in the storage 965. In some examples, the controller 960 may be part of a separate oblique lighting system (including the light ring 910) which may be connected and/or attached to the microscope 905 for usage/implementation. In some examples, the controller 960 may not be a separate component from the microscope 905, but rather may be implemented in an already-existing processor connected to and/or already integrated into the microscope 905. In some examples, the controller 960 may include one or more processors and may be connected to the storage 965 which may store instructions executable by the controller 960. In some examples, the controller 960 may be, for example, a System-on-Chip (SoC), an application specific integrated circuit (ASIC), a field programmable gate array (FPGA), and/or other device/system on which may be stored the executable instructions, and thus such an oblique lighting system may not have a storage 965 separate from the processor. In some examples, the controller 960 may include, for example, a central processing unit (CPU), a general purpose single- and/or multi-chip processor, a single- and/or multi-core processor, a digital signal processor (DSP), one or more other programmable logic devices, and/or any combination thereof suitable to perform the functions described herein, as would be understood by one of ordinary skill in the art.

The storage 965 may include a non-transitory computer-readable storage medium/media storing instructions executable by the controller 960, as well as storing input, images, and other data as described in reference to examples of the present disclosure. The non-transitory computer-readable storage medium/media included in the storage 965 may be any memory, such as a hard disk drive, a removable memory, or a solid-state drive (e.g., flash memory, Random Access Memory (RAM), Dynamic RAM (DRAM), Electrically Erasable Programmable Read-Only Memory (EEPROM), etc.), or the like, as would be understood by one of ordinary skill in the art.

In some examples, a software/hardware combination implemented in an oblique lighting system such as shown in FIG. 9 may be employed to control, analyze, and otherwise implement the methods as described in the present disclosure. As mentioned above, some examples may employ timed sequences of discrete light sources on the light ring 910 to provide lighting for inspection of end connectors of fiber optic cables. In some examples, a system like the oblique lighting system shown in FIG. 9 may employ a software/hardware combination to perform some of the following automated detection, data presentation, and marked-up post-processing of acquired images:

1) Control of the individually-addressable and individually-controllable discrete light sources disposed on the light ring 910. In some examples, lighting sequences, revolving around the DUT, may be generated and corresponding images may be captured (examples of this are described/discussed below).

2) Image Analysis—the oblique lighting system may capture individual images and/or sequences of images.
  a. Static Analysis: in some examples, the oblique lighting system may use single images to identify particulate matter, etc.
  b. Dynamic Analysis: in some examples, the oblique lighting system may look at a sequence of images where each image corresponds to a different, single LED on the light ring 910 being activated. In some examples, the directionality of the shadows cast by features above the ferrule surface of the end connector may be detected and analyzed (automatically) to determine whether the feature(s) are movable particulate matter and therefore cleanable.
  c. Combined Lighting Technique(s), or Modalities, with Brightfield Illumination: in some examples, darkfield illumination images may be automatically compared with brightfield illumination images, and the two sets of images fused/merged to provide a superset of automated detection and measurement (an example of this is discussed/described below). Other lighting techniques may be similarly combined, and thus may be considered adjuncts to darkfield illumination in some examples.

3) Measurement Analysis:
  a. The oblique lighting system in some examples may perform detection of damage around the perimeter of the end connector.
  b. The oblique lighting system in some examples may analyze the circularity of female pin holes, looking for, e.g., particulate matter in, and/or damage to, the inside of the female pin holes, as well as particulate matter on the ferrule surface.
  c. The oblique lighting system in some examples may look for, identify, and highlight particulate matter, scratches, and/or other damage/imperfections (as shown in examples discussed below).
  d. The oblique lighting system in some examples may perform height measurement of the pins (as discussed/described in an example below).

4) Light: as discussed/described above, the oblique lighting system in some examples may control the discrete light sources on the light ring 910.

FIG. 10 illustrates a flow diagram of a method of visually inspecting an end connector of a fiber optic cable by microscope, according to an example. The method 1000 shown in FIG. 10 is provided by way of example and may only be one part of an entire process/procedure. The method 1000 may further omit parts of the method not germane to the present disclosure, as would be understood by one of ordinary skill in the art. Each block shown in FIG. 10 may further represent one or more steps, processes, methods, or subroutines, as would be understood by one of ordinary skill in the art. For the sake of convenience and ease of explanation, the blocks in FIG. 10 may refer to the components in FIG. 9 and/or descriptions of the other figures described herein; however, the method 1000 is not limited in any way to the components, apparatuses, and/or constructions shown in any of the figures described herein.

At block 1010, the controller 960 may control the light sources in the light ring 910 to light in a time sequence. In some examples, the controller 960 may control each light source to light up separately, one at a time, in the time sequence. In some examples, the controller 960 may control the light sources to light up in a more complex pattern over time, where varying groups of light sources are lit up, or other lighting parameters may be varied, such as light intensity.

At block 1020, the controller 960 may control the imager 950 to take a series of images of the end connector while the light sources are being lit up in a time sequence in block 1010. Accordingly, blocks 1010 and 1020 may be performed substantially simultaneously. In examples where each light source is lit up separately in a time series, the imager 950 may take an image as each separate light source is lit up. In some examples, the imager 950 may effectively make a video of the end connector during the lighting sequence.

At block 1030, the controller 960 may analyze the series of images to identify surface particulates on the end connector and determine whether any identified surface particulates are cleanable, i.e., may be removable by cleaning the ferrule surface of the end connector. In some examples, the controller 960 analyzes by detecting changes in the directionality, shape, and/or size of shadows cast in the series of images to identify surface particulates and/or to determine whether any identified surface particulates are cleanable.

At block 1040, the controller 960 may provide feedback to a user identifying any surface particulates and indicating whether any identified surface particulates are cleanable, i.e., are removable from the ferrule surface of the end connector. In some examples, this feedback may be an image, a series of images, and/or a video generated by the controller 960. In some examples, this feedback may include visual indicia indicating surface particulates and separately indicating cleanable surface particulates in an image, a series of images, and/or a video. In such examples, the visual indicia may be, for example, a color code, a label, an icon, added shadowing/shadows, added visual changes in the shapes/features, or any other sort of visual indication, as would be understood by one of ordinary skill in the art.

In some examples, the controller 960 may not take a series of images, but rather a single image. In some examples, the controller 960 may also make other determinations during the analysis of block 1030, such as identifying defects and/or imperfections on the surface and/or elsewhere on the end connector; detecting damage to the end connector, specifically analyzing the features of male pins and/or female pin holes (such as, e.g., the various dimensions of such pins/pin holes, detecting damage and/or particulate matter inside female pin holes, calculating the heights of male pins, etc.); measuring one or more dimensional features of the end connector; otherwise quantifying departures from specified geometric tolerances of the end connector; and the like, as would be understood by one of ordinary skill in the art. Such an identified defect and/or imperfection may include, for example, dirt or surface particulate matter, scratches, pits, hillocks, organic matter (such as, e.g., grease or oil), and/or any deviations from any specified dimensions/qualities of the end connector (e.g., pin height, pin hole width and depth, and/or any other features/qualities of the structure of the end connector), as would be understood by one of ordinary skill in the art. In some examples, the feedback in block 1040 may include feedback concerning any identified defect and/or imperfection (including damage), any one or more dimensional features of the end connector, and the like. In some examples, the feedback in block 1040 may include specific information, guidance, and/or visual indicia concerning any identified defect and/or imperfection (including damage), any one or more dimensional features of the end connector, etc., where such specific information, guidance, and/or visual indicia may, for example, identify dirt or surface particulate matter, scratches, pits, hillocks, organic matter (such as, e.g., grease or oil), and/or any deviations from any specified dimensions/qualities of the end connector (e.g., pin height, pin hole width and depth, and/or any other features/ qualities of the structure of the end connector), as would be understood by one of ordinary skill in the art.

In some examples, the controller 960 may use multiple different light techniques/modalities, such as, for example, both darkfield and brightfield illumination. In such examples, the controller 960 may combine images made using the multiple different light techniques/modalities, such as, for example, making an image combining both darkfield and brightfield illumination. In some examples, digital signal processing and/or a similar technique may be used to perform one or more blocks in FIG. 10 and/or any other analysis, determination, calculation, etc., as described herein, as would be understood by one of ordinary skill in the art.

In examples according to the present disclosure, the method 1000 (whether performed, in whole or in part, by the controller 960 in the example of FIG. 9 or another component of the microscope 905) may be implemented by at least one of any type of application, program, library, script, task, service, process, or any type or form of executable instructions executed on hardware such as circuitry that may include digital and/or analog elements (e.g., one or more transistors, logic gates, registers, memory devices, resistive elements, conductive elements, capacitive elements, and/or the like, as would be understood by one of ordinary skill in the art). In some examples, the hardware and data processing components used to implement the various processes, operations, logic, and circuitry described in connection with the examples described herein may be implemented with a general purpose single- and/or multi-chip processor, a single- and/or multi-core processor, a digital signal processor (DSP), an application specific integrated circuit (ASIC), a field programmable gate array (FPGA), or other programmable logic device, discrete gate or transistor logic, discrete hardware components, and/or any combination thereof suitable to perform the functions described herein. A general purpose processor may be any conventional processor, microprocessor, controller, microcontroller, and/or state machine. In some examples, the storage 965 may include one or more components (e.g., random access memory (RAM), read-only memory (ROM), flash or solid state memory, hard disk storage, etc.) for storing data and/or computer-executable instructions for completing and/or facilitating the processing and storage functions described herein. In some examples, the storage 965 may be non-volatile memory, and may include database components, object code components, script components, or any other type of information structure suitable for implementing the various activities and storage functions described herein.

Figures 11A, 11B, 12A, 12B:
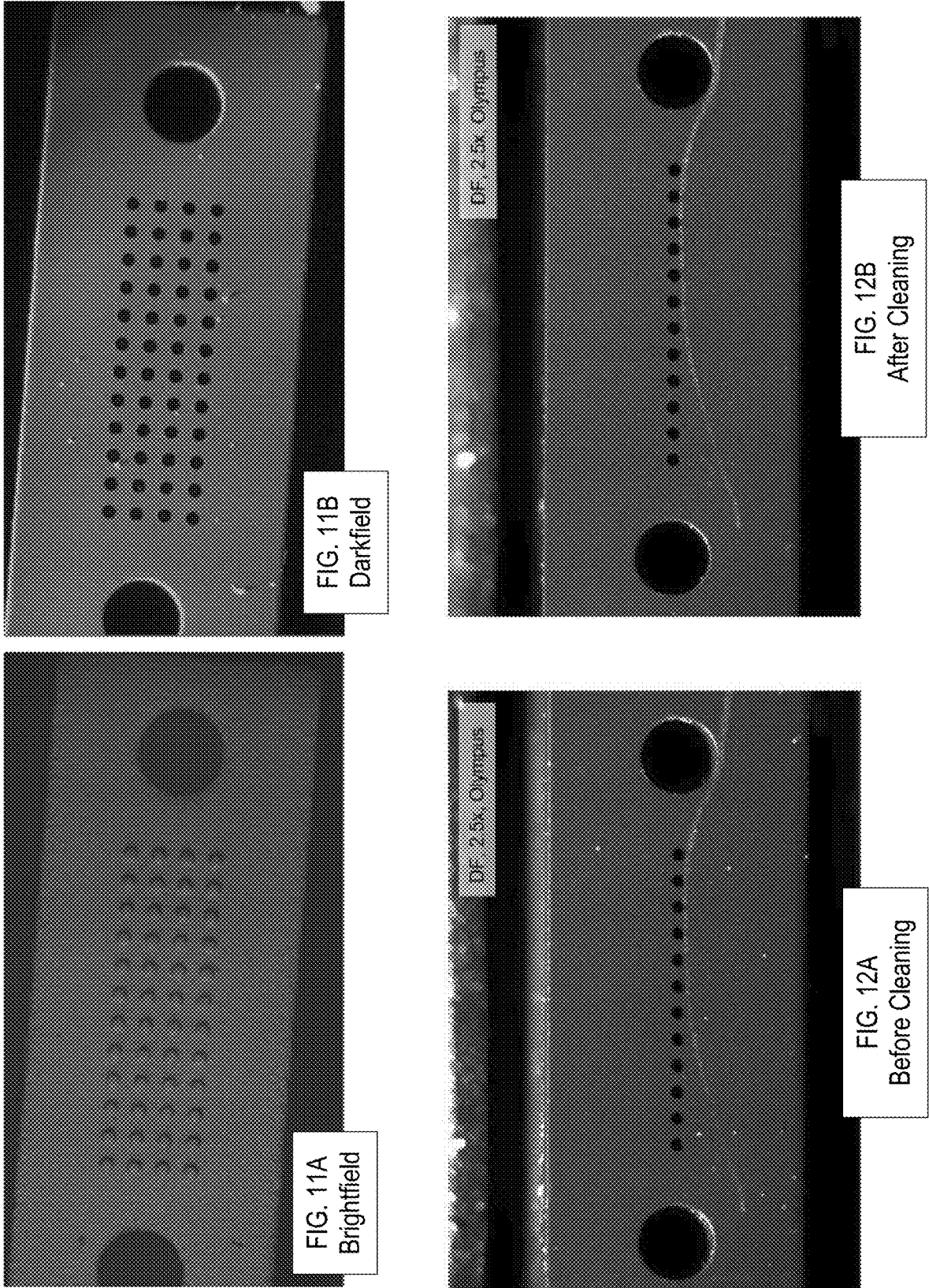
FIGS. 11A and 11B are images illustrating that oblique darkfield illumination according to an example of the present disclosure may effectively highlight particulate matter on the ferrule surface of an end connector.
FIGS. 12A and 12B are images illustrating that oblique darkfield illumination according to an example of the present disclosure may effectively highlight particulate matter which may be cleanable from the ferrule surface of an end connector.

FIGS. 11A and 11B are images illustrating that oblique darkfield illumination according to an example of the present disclosure may effectively highlight particulate matter on the ferrule surface of an end connector. In FIG. 11A, an MPO end connector is shown where very little detail or features are visible, and thus there is little evidence of particulate matter. In FIG. 11B, the same MPO end connector is shown under darkfield illumination according to an example of the present disclosure, with a relatively high AOI providing distinctive visible features (i.e., particulate matter) on the ferrule surface.

FIGS. 12A and 12B are images illustrating that oblique darkfield illumination according to an example of the present disclosure may effectively highlight particulate matter which may be cleanable from the ferrule surface of an end connector. In FIG. 12A, an MPO end connector is shown (before cleaning) under darkfield illumination with a relatively high AOI according to an example of the present disclosure, and thus distinctive visible features (i.e., particulate matter) on the ferrule surface are visible. In FIG. 12B, the same MPO end connector is shown (after cleaning) under darkfield illumination according to an example of the present disclosure, where it may be seen that the visible particulate matter on the ferrule surface has been removed in the cleaning process, thereby demonstrating that darkfield illumination with a relatively high AOI according to an example of the present disclosure may provide an indication that the particular matter is cleanable.

Figure 13A:
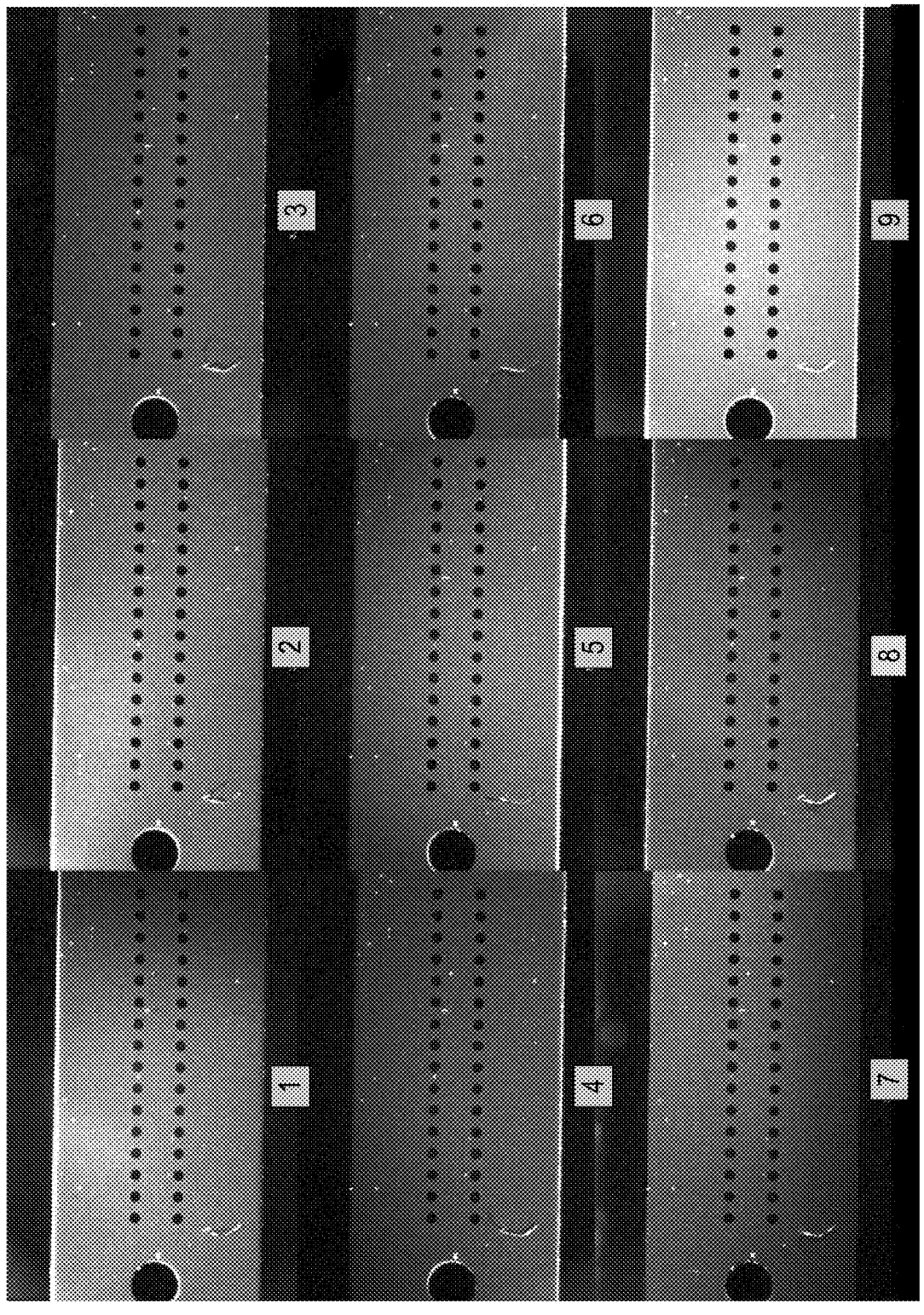
FIGS. 13A and 13B are images illustrating the features revealed by sequentially lighting each light source in the light ring over time according to an example of the present disclosure.
Figure 13B:
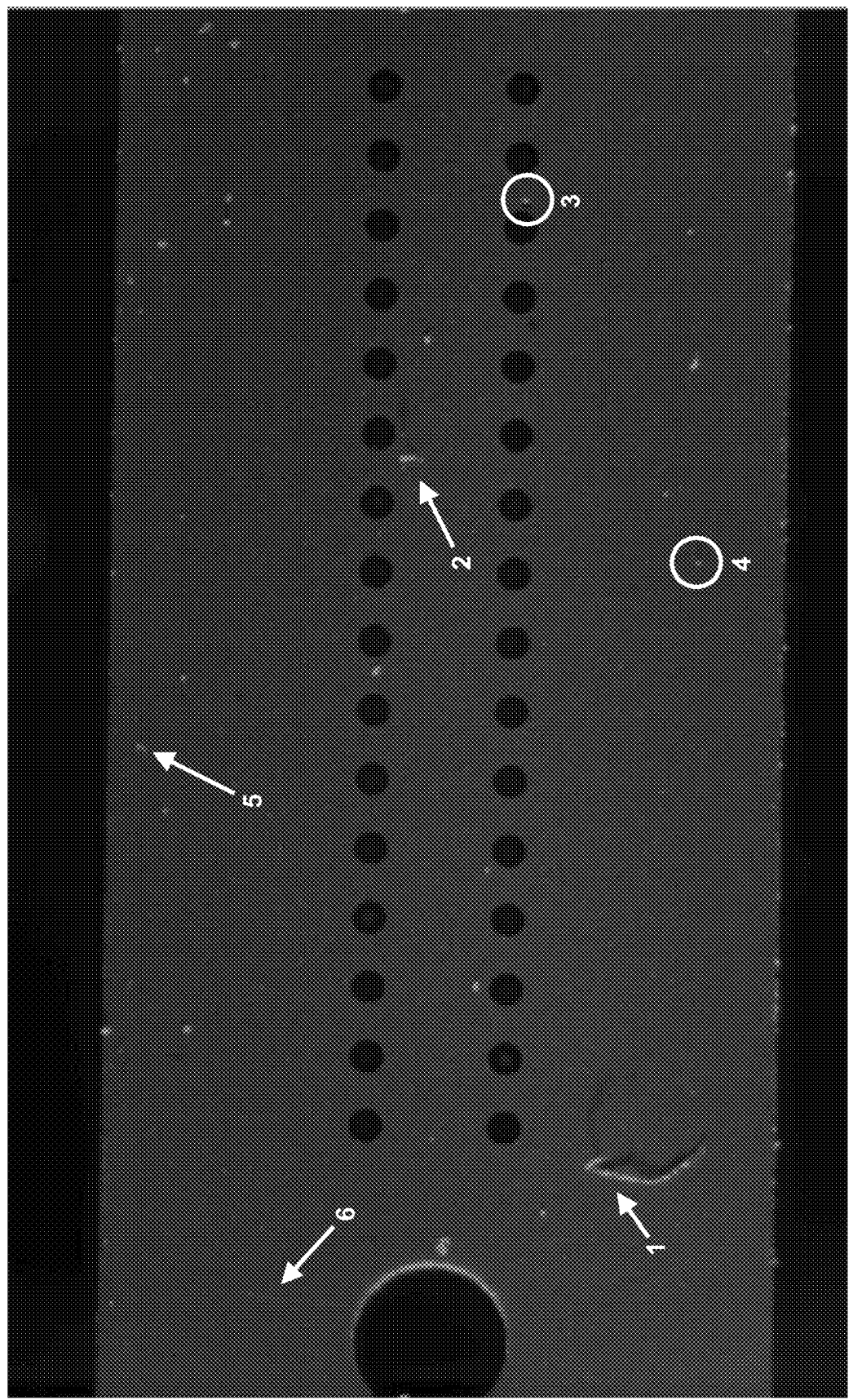

FIG. 13A is a series of images over time as different light sources in the light ring are sequentially lit according to an example of the present disclosure. More specifically, FIG. 13A is a series of nine (9) images labelled consecutively (in time-series) by reference numerals 1, 2, 3, 4, 5, 6, 7, 8, and 9, as different light sources are progressively turned on and off in the light ring providing darkfield illumination to the end connector shown therein. FIG. 13B is an image of the same end connector shown in FIG. 13A with markings illustrating the revealed features according to an example of the present disclosure. In FIG. 13A, six separate LEDs in a light ring were separately lit in a timed sequence as the 9 different images shown in FIG. 13A were taken. As shown in FIGS. 13A and 13B, different features may be revealed as different LEDs are lit up. Fibers labelled with reference numerals "1" and "2" in FIG. 13B may be identified as being fibers in some of the nine images of FIG. 13A more than others. The small particulate matter in the circles labelled with reference numerals "3" and "4" in FIG. 13B, as well as the reflective object labelled with reference numeral "5" in FIG. 13B, are shown to have a wide variation of lighting in the nine images of FIG. 13A. The scratch labeled with reference numeral "#6" in FIG. 13B is only visible and identifiable as a scratch at certain lighting angles, as illustrated by, e.g., image 7 in FIG. 13A.

In some examples, the controller 960 may automatically detect such features from a sequence of images taken by the imager 950, and may provide feedback to a user indicating which features are scratches, cleanable particulate matter, uncleanable/unmovable particulate matter, defects/imperfections which may be polished and/or otherwise mitigated, defects/imperfections which may not be polished and/or otherwise mitigated, and/or other defects and/or imperfections. Accordingly, a user of an oblique lighting system in accordance with examples of the present disclosure may be provided actionable information—i.e., information which may provide guidance as to what steps should be performed next, based on the inspection. In some examples, identification and delineation of small, localized pixel changes (caused by, e.g., shadows, changes in the orientation and/or shape of shadows, etc.), as opposed to large lighting gradient changes, near features may provide more identifiable, distinctive information for identification of different features by the controller 960.

As mentioned above, different lighting techniques (or modalities) may be combined with darkfield illumination with a relatively high AOI according to some examples of the present disclosure. As shown in FIGS. 14A-14C and 15A-15B, darkfield illumination may complement brightfield illumination in some examples.

FIGS. 14A-14C are images illustrating how brightfield illumination and darkfield illumination may be beneficially combined in accordance with an example of the present disclosure. FIGS. 14A-14C also illustrate how brightfield illumination and darkfield illumination may provide complementary insights while inverting colors, in accordance with an example of the present disclosure. FIG. 14A is an image of an MPO end connector under darkfield illumination according to an example of the present disclosure; whereas FIG. 14B is an image of the same MPO end connector under brightfield illumination. The darkfield illumination in FIG. 14A provides an image with crisp edges suitable for geometric measurements, as indicated by box 1410A and box 1420A, and enhances the visibility of particulate matter, as indicated by the block arrows and discussed in detail above. For instance, the sides and pin hole of the MPO end connector have crisp edges in FIG. 14A. The brightfield illumination in FIG. 14B provides an image which may enhance the visibility of surface defects not as visible under darkfield illumination. For instance, the defects and imperfections shown in box 1410B and box 1420B. FIG. 14C is an image combining brightfield illumination and darkfield illumination of the same MPO end connector.

As shown in FIG. 14C, the image using both lighting techniques combined has sharp edges (which may be suitable for geometric measurements), and shadows and lighting highlighting particulate matter on the ferrule surface, as well as lighting indicating where there may be surface defects. Accordingly, in some examples, brightfield illumination and darkfield illumination may be combined to effectively enhance the visibility of a variety of quality control problems with end connectors, such as, e.g., particulate matter (and the identification of cleanable vs. uncleanable particulate matter), surface defects, and/or imperfections, as well as providing the capability of making geometric measurements of features and dimensions of end connectors. In some examples, images are taken while two or more lighting techniques are employed simultaneously; in other examples, multiple separate images, each taken using a different technique, are merged/fused by, e.g., the controller 960.

Figure 15A:
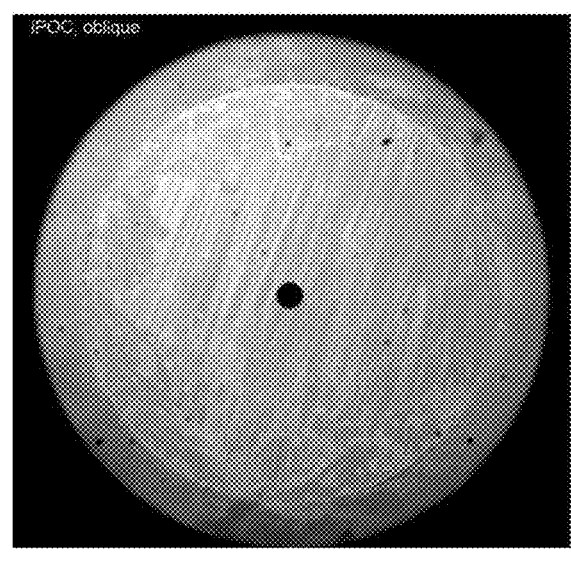
FIGS. 15A and 15B are images illustrating how brightfield illumination and darkfield illumination may be combined in accordance with an example of the present disclosure.
Figure 15B:
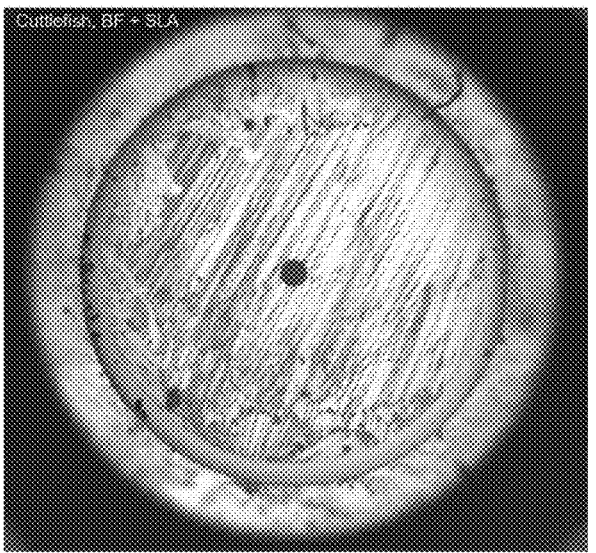

FIGS. 15A and 15B are images illustrating how brightfield illumination and darkfield illumination may be beneficially combined in accordance with an example of the present disclosure. FIGS. 15A and 15B also illustrate how combining brightfield illumination and darkfield illumination may enhance edges and other features for detection, geometric measurement, etc., in accordance with an example of the present disclosure. FIG. 15A is an image of a simplex end connector under darkfield illumination according to an example of the present disclosure; whereas FIG. 15B is an image of the same simplex end connector under brightfield illumination. As shown in FIG. 15A, the darkfield illumination image may provide other insights over brightfield illumination, such as, for example, enhancing the visibility of organic matter (such as oils, including, e.g., residue from human finger contact), but may not be as effective at enhancing the visibility of particulate matter at the rounded/beveled edge of the ferrule surface. By contrast, as shown in FIG. 15B, the brightfield illumination image may provide other insights besides darkfield illumination, such as, for example, enhancing the visibility of particulate matter and/or defects/imperfections at the rounded/beveled edge of the ferrule surface. Accordingly, in some examples, brightfield illumination and darkfield illumination may be combined to effectively enhance the visibility of a variety of quality control problems with end connectors, such as, e.g., organic residue (such as, e.g., grease, human fingerprints, etc.), particulate matter (and the identification of cleanable vs. uncleanable particulate matter), surface defects, and/or imperfections, as well as providing the capability of making geometric measurements of features and dimensions of end connectors.

Figure 16A:
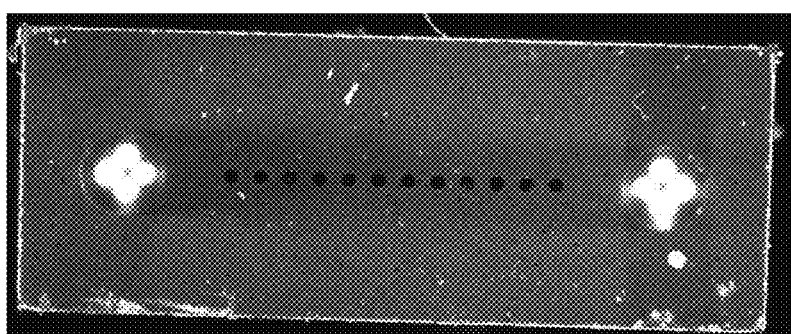
FIGS. 16A and 16B are images illustrating how the effects of pin shadows may be mitigated by the number of light sources on the light ring, according to an example of the present disclosure.

Darkfield illumination may, in some cases, cause pin shadows which may disrupt accurate inspections and/or measurement of end connectors for purposes of, e.g., quality control. For instance, a pin shadow may somewhat obscure the ferrule surface, as illustrated by FIG. 16A. In some examples, the pin shadow effect may be mitigated by the number of LEDs in the light ring, as illustrated by FIG. 16B, and/or the appropriate placement of LEDs on the light ring, as illustrated by FIGS. 17A-17B and 18A-18C.

Figure 16B:
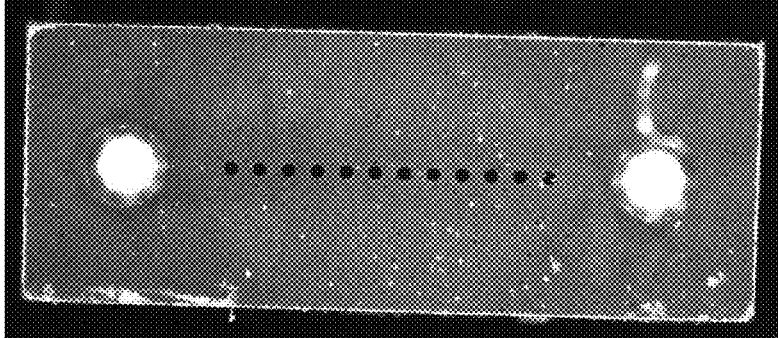

FIGS. 16A and 16B are images illustrating how the effects of pin shadows may be mitigated by the number of light sources on the light ring, according to an example of the present disclosure. FIG. 16A is an image of a male MPO end connector illuminated by 4 LEDs in a light ring, while FIG. 16B is an image of the same male MPO end connector illuminated by a light ring with 8 LEDs in a light ring. As shown in FIG. 16A, the shadows cast by the 2 pins when lit by the 4 LEDs may directly obscure the fiber ends of the MPO end connector. By contrast, the shadows cast by the same 2 pins are mitigated when lit by the 8 LEDs as shown in FIG. 16B. In some examples, the number of light sources may be selected, at least in part, to mitigate any shadows which may be caused by features such as pins on male MPO end connectors.

FIGS. 17A-17B and 18A-18C are diagrams and images illustrating how the effects of pin shadows may be mitigated by the placement of light sources on the light ring, according to examples of the present disclosure. FIG. 17A is a block diagram illustrating a placement of 8 LEDs on a light ring, while FIG. 17B is an image of a male MPO end connector showing the shadows caused by the placement of LEDs shown in FIG. 17A. As shown in FIG. 17B, the LED placement shown in FIG. 17A may cause shadows directly obscuring the fiber ends of the male MPO end connector.

According to examples of the present disclosure, a 360° circle representing the light ring may be divided by N, the number of light sources, to determine the angle slices/portions of N equidistant light sources on the light ring. As mentioned above, the number N may vary, depending on the particular implementation, type of light source, etc., from 4 or less to 16 or more, as would be understood by one of ordinary skill in the art. This angle may be divided in two to determine an optimum offset for the placement of the N light sources on the light ring. This offset angle may be measured from the line representing the axis of fiber ends on the end connector. Using the example of N=8 LEDs, the equidistant angle slice/portions may be 45°, which, when divided by 2, equals 22.5°. Accordingly, an optimum placement of the LEDs may be when the 4 LEDs closest to the axis of the fiber ends of the end connector are positioned at an angle of 22.5° to that axis. FIGS. 18A-18C illustrate such an optimum placement.

FIG. 18A is a block diagram illustrating such an optimum placement of 8 LEDs on a light ring; FIG. 18B is an image of a male MPO end connector showing the shadows caused by the placement of LEDs shown in FIG. 18A; and FIG. 18C superimposes the LED block diagram of FIG. 18A on an image of the male MPO end connector to illustrate the 22.5° angle described as optimum for placement of 8 LEDs in the above paragraph. As shown in FIG. 18B, the LED placement shown in FIG. 18A may cause shadows which may barely obscure any of the fiber ends of the male MPO end connector. FIG. 18C has one dotted line representing the axis of the fiber ends of the male MPO connector and another dotted line through one of the LEDs, thereby forming the 22.5° angle described above. In some examples (such as, e.g., FIGS. 8A-8C), the location of light sources on the light ring may be selected, at least in part, to mitigate any shadows which may be caused by features such as pins on male MPO end connectors. In some examples, the number, location, and other characteristics of the light sources may be selected, at least in part, to mitigate any shadows which may be caused by features on the end connectors (such as, e.g., the pins on male MPO end connectors).

Figure 19:
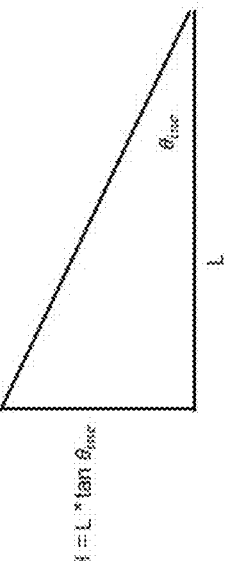
FIG. 19 is an image illustrating how trigonometry may be employed to calculate the height of a pin on a male MPO end connector, according to an example of the present disclosure.

In some examples, trigonometric principles may be employed to make measurements of dimensional features of end connectors. For instance, trigonometry may be applied to shadows cast by certain features lit by darkfield illumination in order to make measurements of certain dimensions (i.e., height, width, and/or depth). FIG. 19 is an image illustrating how trigonometry may be employed to calculate the height of a pin on a male MPO end connector according to an example of the present disclosure. In FIG. 19, a length of a shadow cast by the left-hand pin is indicated both by an outline of the shadow as well as an arrow indicating the length of the shadow. The height of any feature may be calculated using the trigonometric relationship of:

$$H = L \times \tan\theta_{inc}$$

where H=height of the feature (in this case, the pin)
  L=length of the shadow cast
  $\theta_{inc}$=angle of inclination (this may approximate the angle alpha $\alpha$ discussed in relation to FIGS. 7A and 7D)

Accordingly, as shown in FIG. 19, trigonometric principles may be employed to make measurements of dimensional features of end connectors.

While examples described herein are directed to configurations as shown, it should be appreciated that any of the components described or mentioned herein may be altered, changed, replaced, or modified, in size, shape, and numbers, or material, depending on application or use case, and adjusted for desired resolution or optimal measurement results. Moreover, single components may be provided as multiple components, and vice versa, to perform the functions and features described herein. It should be appreciated that the components of the system described herein may operate in partial or full capacity, or it may be removed entirely. It should also be appreciated that analytics and processing techniques described herein with respect to the optical measurements, for example, may also be performed partially or in full by other various components of the overall system.

It should be appreciated that data stores may also be provided to the apparatuses, systems, and methods described herein, and may include volatile and/or nonvolatile data storage that may store data and software or firmware including machine-readable instructions. The software or firmware may include subroutines or applications that perform the functions of the measurement system and/or run one or more application that utilize data from the measurement or other communicatively coupled system.

The various components, circuits, elements, components, and interfaces may be any number of mechanical, electrical, hardware, network, or software components, circuits, elements, and interfaces that serves to facilitate communication, exchange, and analysis data between any number of or combination of equipment, protocol layers, or applications.

For example, the components described herein may each include a network or communication interface to communicate with other servers, devices, components or network elements via a network or other communication protocol.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

The invention claimed is:

1. A system of oblique lighting, comprising:
a light ring comprising a plurality of light sources disposed in a circular pattern to illuminate an end connector of a fiber optic cable for viewing under a microscope;
a redirection ring disposed to receive light directly from the plurality of light sources disposed on the light ring and to redirect the light from the plurality of light sources onto a surface of the end connector with an angle of incidence (AOI) sufficient to provide darkfield illumination;
an imager connected to the microscope to capture images of the surface of the end connector under darkfield illumination; and
a controller to:
control each of the plurality of light sources to light in a time sequence;
control the imager to capture a series of images where each image corresponds to when one of the plurality of light sources is lit up; and
analyze the captured series of images to identify surface particulates on the surface of the end connector.

2. The system of claim 1, wherein the controller is to further analyze the captured series of images to determine whether any identified surface particulates are cleanable.

3. The system of claim 2, wherein the controller is to further provide feedback at least one of identifying any identified surface particulates or identifying any identified surface particulates that are cleanable.

4. The system of claim 1, wherein the controller is to further analyze the captured series of images to identify at least one of a defect or an imperfection in the surface of the end connector.

5. The system of claim 1, wherein the controller is to further analyze the captured series of images to measure one or more dimensional features of the surface of the end connector.

6. The system of claim 1, wherein the redirection ring comprises:
a reflector ring comprising an inner reflective surface, wherein the inner reflective surface is disposed to receive light directly from the plurality of light sources and to reflect the light from the plurality of light sources onto the surface of the end connector with an AOI sufficient to provide darkfield illumination.

7. The system of claim 1, wherein the redirection ring comprises:
a refractor ring comprising a refractive body, wherein the refractive body is disposed to receive light directly from the plurality of light sources and to refract the light from the plurality of light sources onto the surface of the end connector with an angle of incidence (AOI) sufficient to provide darkfield illumination.

8. The system of claim 1, wherein the plurality of light sources are disposed on a planar ring parallel to a plane of an objective lens of the microscope, and a center of the planar ring coincides with a viewing axis of the microscope.

9. A method for inspecting, under a microscope, an end connector of a fiber optic cable, comprising:
controlling, by a controller, each of a plurality of light sources in a light ring to light separately in a time sequence,
wherein the light ring comprises the plurality of light sources disposed on a planar ring parallel to a plane of an objective lens of the microscope and a center of the planar ring coincides with a viewing axis of the microscope;
wherein a redirection ring is disposed to receive light directly from the plurality of light sources disposed on the light ring and to redirect the received light onto a surface of the end connector; and
wherein each of the plurality of light sources in the light ring provides light onto the surface of the end connector with an angle of incidence (AOI) sufficient to produce darkfield illumination to the surface of the end connector under the microscope;
controlling, by the controller, an imager to capture a series of images where each image corresponds to when one of the plurality of light sources is lit up;
analyzing, by the controller, the captured series of images to identify surface particulates on the surface of the end connector; and
analyzing, by the controller, the captured series of images to determine whether any identified surface particulates on the surface of the end connector are cleanable.

10. The method of claim 9, further comprising:
providing, by the controller, feedback at least one of identifying any identified surface particulates or identifying any identified surface particulates that are cleanable.

11. The method of claim 9, further comprising:
analyzing, by the controller, the captured series of images to identify any defect or imperfection of the surface of the end connector.

12. The method of claim 9, further comprising:
analyzing, by the controller, the captured series of images to identify any organic matter on the surface of the end connector,
wherein organic matter comprises at least one of grease or oil.

13. The method of claim 9, further comprising:
analyzing, by the controller, the captured series of images to measure one or more dimensional features of the surface of the end connector.

14. The method of claim 9, wherein each of the plurality of light sources is lit separately such that varying shadows in the captured series of images indicate at least one of particulate matter, defects, or imperfections on the surface of the end connector.

* * * * *